United States Patent
Shimoyoshi et al.

(10) Patent No.: US 6,741,965 B1
(45) Date of Patent: May 25, 2004

(54) DIFFERENTIAL STEREO USING TWO CODING TECHNIQUES

(75) Inventors: Osamu Shimoyoshi, Kanagawa (JP); Kyoya Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/202,157

(22) PCT Filed: Apr. 10, 1998

(86) PCT No.: PCT/JP98/01672

§ 371 (c)(1), (2), (4) Date: Mar. 12, 1999

(87) PCT Pub. No.: WO98/46045

PCT Pub. Date: Oct. 15, 1998

(30) Foreign Application Priority Data

Apr. 10, 1997 (JP) ............................................ P09-092448

(51) Int. Cl.[7] ............................................... G10L 19/00
(52) U.S. Cl. .................................... 704/500; 704/200.1
(58) Field of Search .............................. 704/200.1, 200, 704/500–504; 381/2–10

(56) References Cited

U.S. PATENT DOCUMENTS

| | | | | |
|---|---|---|---|---|
| 5,285,498 A | * | 2/1994 | Johnston | 381/2 |
| 5,481,614 A | * | 1/1996 | Johnston | 381/2 |
| 5,592,584 A | * | 1/1997 | Ferreira et al. | 704/200.1 |
| 5,627,938 A | * | 5/1997 | Johnston | 704/200.1 |
| 6,041,295 A | * | 3/2000 | Hinderks | 704/200.1 |

FOREIGN PATENT DOCUMENTS

| | | | | |
|---|---|---|---|---|
| JP | 64-52400 | 3/1989 | | H04S/7/00 |
| JP | 1-247000 | 10/1989 | | H04S/1/00 |
| JP | 2-210666 | 8/1990 | | G11B/20/10 |
| JP | 7-221717 | 8/1995 | | H04B/14/04 |

* cited by examiner

*Primary Examiner*—David D. Knepper
(74) *Attorney, Agent, or Firm*—Sonneschein, Nath & Rosenthal LLP

(57) ABSTRACT

A first audio signal is generated from a number of stereo input channels (such as a left and a right channel). A signal level that corresponds to one of the plurality of input channels and another signal level from another of the plurality of input channels are determined. A second audio signal is selected on the basis of the signal levels such that the second audio signal is selected from the group consisting of the one input channel, the other input channel, and a signal generated from the number of input channels that is different than the first audio signal. The first audio signal and the selected second audio signal are separately coded.

61 Claims, 28 Drawing Sheets

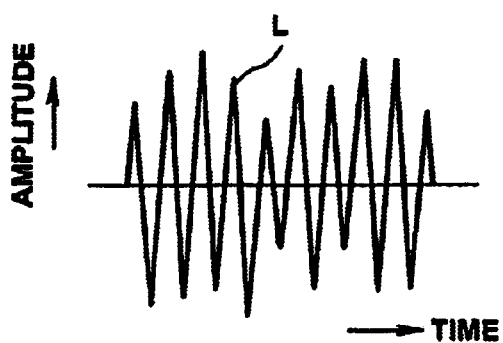
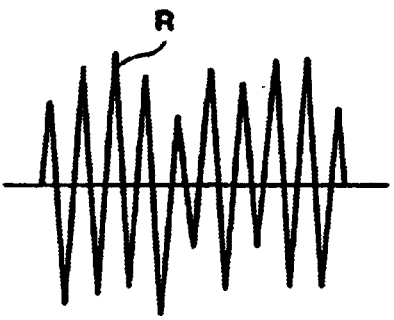
FIG. 1A (PRIOR ART) FIG. 1B (PRIOR ART)
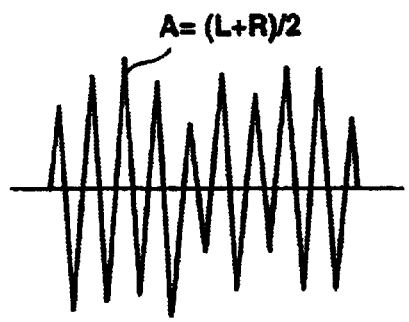
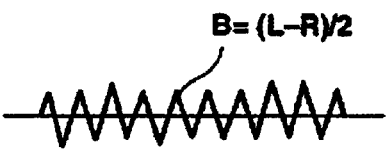
FIG. 1C (PRIOR ART) FIG. 1D (PRIOR ART)
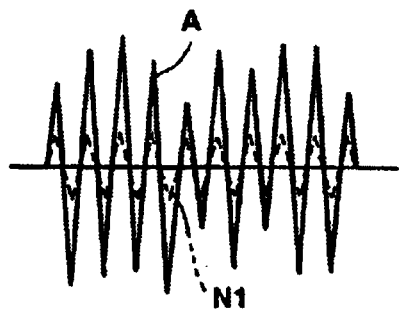
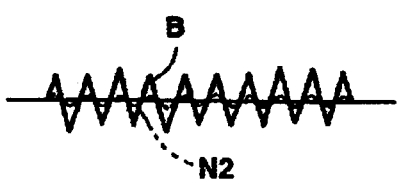
FIG. 1E (PRIOR ART) FIG. 1F (PRIOR ART)
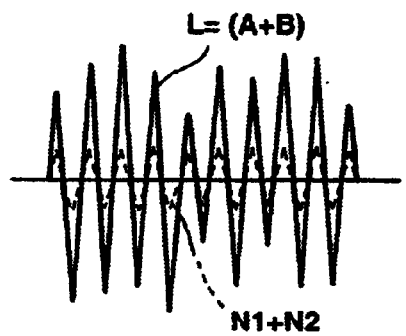
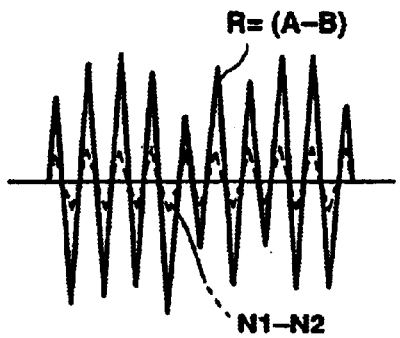
FIG. 1G (PRIOR ART) FIG. 1H (PRIOR ART)

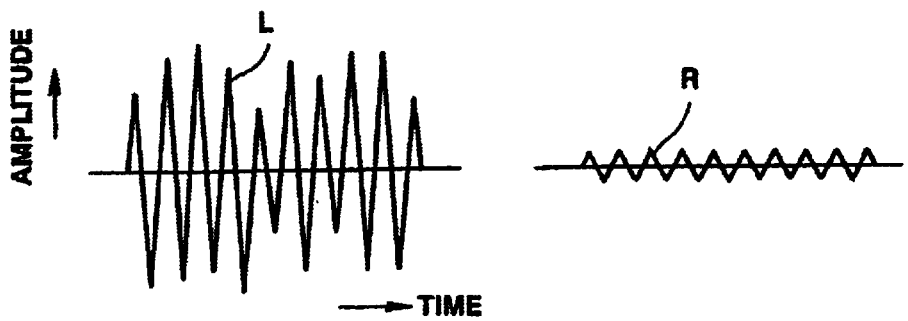
FIG.2A (PRIOR ART)  FIG.2B (PRIOR ART)
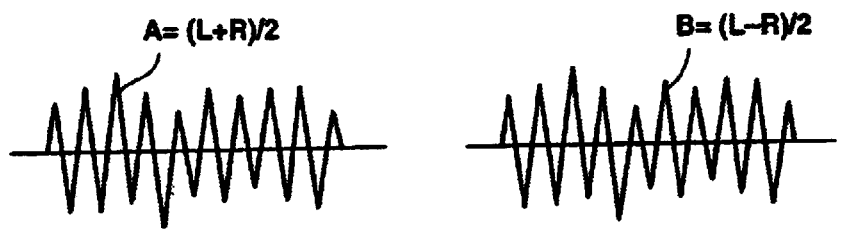
FIG.2C (PRIOR ART)  FIG.2D (PRIOR ART)
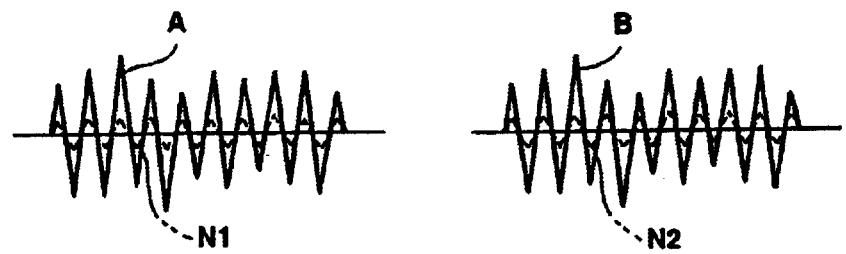
FIG.2E (PRIOR ART)  FIG.2F (PRIOR ART)
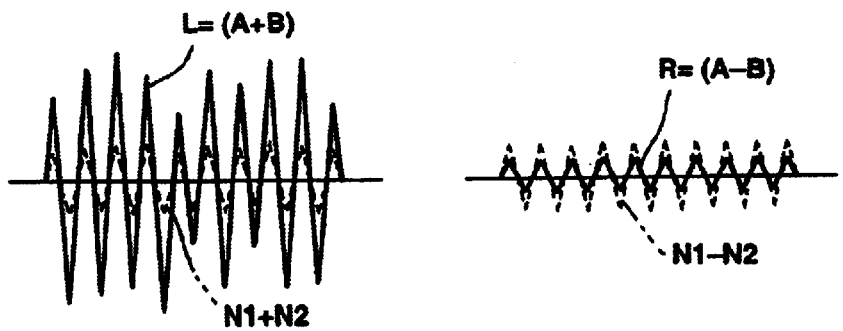
FIG.2G (PRIOR ART)  FIG.2H (PRIOR ART)

DIFFERENTIAL STEREO USING TWO CODING TECHNIQUES

TECHNICAL FIELD

This invention relates to coding method and device suitable for expanding the format of coded signals, decoding method and device corresponding thereto, and a recording medium on which coded signals are recorded.

BACKGROUND ART

Conventionally, a signal recording medium such as a magneto-optical disc has been proposed as a medium on which signals like coded acoustic information or audio information (hereinafter referred to as audio signals) can be recorded. There are various methods for high-efficiency coding of the audio signals, which can be exemplified by, for example, so-called transform coding, which is a blocking frequency band division system for blocking audio signals on the time base by a predetermined time unit, then transforming (spectrum transform) the signals on the time base of each block to signals on the frequency base so as to divide the signal into a plurality of frequency bands, and coding the signal of each band, or so-called subband coding (SBC), which is a non-blocking frequency band division system for dividing audio signals on the time base into a plurality of frequency bands without blocking the signals, and then coding the signals. Also, a method for high-efficiency coding using the above-described subband coding and transform coding in combination is considered. In this case, for example, after band division is carried out in the subband coding, the signal of each band is spectrum-transformed to a signal on the frequency base, and this spectrum-transformed signal of each band is coded.

As a filter for band division used in the above-described subband coding, a filter such as a so-called QMF (quadrature mirror filter) is employed. This QMF filter is described in R. E. Crochiere, "Digital coding of speech in subbands," Bell Syst. Tech. J., Vol.55, No.8, 1976. This QMF filter is adapted for bisecting a band with equal band widths, and is characterized in that so-called aliasing is not generated in synthesizing the divided bands. Also, in Joseph H. Rothweiler, "Polyphase Quadrature filters—A new subband coding technique," ICASSP 83, BOSTON, a filter division method for equal band widths is described. This polyphase quadrature filter is characterized in that it can divide, at a time, a signal into a plurality of bands of equal band widths.

As the above-described spectrum transform, for example, input audio signals are blocked by a predetermined unit time (frame), and discrete Fourier transform (DFT), discrete cosine transform (DCT), modified discrete cosine transform (MDCT) or the like is carried out for each block, thereby transforming the time base to the frequency base. The above-mentioned MDCT is described in J. P. Princen, A. B. Bradley, "Subband/Transform Coding Using Filter Bank Designs Based on Time Domain Aliasing Cancellation," Univ. of Surrey Royal Melbourne Inst. of Tech., ICASSP 1987.

In the case where the above-mentioned DFT or DCT is used as a method for spectrum transform of a waveform signal, M units of independent real-number data are obtained by carrying out transform using a time block constituted by M units of sample data. (This block is hereinafter referred to as a transform block.) To reduce connection distortion between transform blocks, normally, M1 units of sample data of each of adjacent transform blocks are caused to overlap each other. Therefore, in DFT or DCT, M units of real-number data are obtained with respect to (M–M1) units of sample data on the average, and these M units of real-number data are subsequently quantized and coded.

On the other hand, in the case where the above-mentioned MDCT is used as a method for spectrum transform, M units of real-number data are obtained from 2M units of sample data which are obtained by causing M units of sample data of each of adjacent transform blocks to overlap each other. That is, in the case where MDCT is used, M units of real-number data are obtained with respect to M units of sample data on the average, and these M units of real-number data are subsequently quantized and coded. In a decoding device, waveform elements obtained by carrying out inverse transform of each block, from the code obtained by using MDCT, are added to each other while being caused to interfere with each other, thereby reconstituting a waveform signal.

Meanwhile, in general, if the transform block for spectrum transform is made long, the frequency resolution is enhanced and energy is concentrated on a specified spectral signal component. Therefore, by carrying out spectrum transform using a long transform block length obtained by causing sample data of adjacent transform blocks to overlap each other by half thereof each, and using MDCT such that the number of obtained spectral signal components is not increased with respect to the number of original sample data on the time base, more efficient coding can be carried out than in the case where DFT or DCT is used. Also, by providing a sufficiently long overlap of the adjacent transform blocks, connection distortion between the transform blocks of the waveform signals can be reduced. However, since a longer transform block for transform requires a greater work area for transform, it becomes an obstacle to miniaturization of reproducing means or the like. Particularly, employment of a long transform block at the time when increase in integration degree of a semiconductor is difficult leads to increase in cost, and therefore needs to be considered carefully.

As described above, by quantizing a signal component divided for each band by using a filter or spectrum transform, a band where quantization noise is generated can be controlled. Therefore, utilizing characteristics of a so-called masking effect, auditorily more efficient coding can be carried out. In addition, by normalizing each sample data using the maximum value of the absolute value of the signal component in each band before carrying out quantization, more efficient coding can be carried out.

As the frequency division width in the case where each signal obtained by carrying out frequency band division of audio signals is to be quantized, a band width in consideration of human auditory characteristics may be preferably used. Specifically, it is preferred to divide audio signals into a plurality of bands (for example, 25 bands) by using a band width referred to as a critical band that generally becomes greater in higher frequency bands. In coding data of each band in this case, coding based on predetermined bit distribution for each band or adaptive bit allocation for each band is carried out. For example, in coding coefficient data obtained by MDCT processing by using the above-mentioned bit allocation, coding with an adaptive number of allocated bits is carried out with respect to MDCT coefficient data of each band obtained by MDCT processing for each transform block. As bit allocation methods, the following two method are known.

For example, in R. Zelinski and P. Noll, "Adaptive Transform Coding of Speech Signals," IEEE Transactions of Acoustics, Speech, and Signal Processing, vol. ASSP-25, No.4, August 1977, bit allocation is carried out on the basis of the magnitude of the signal of each band. In this method, the quantization noise spectrum becomes flat and the noise energy becomes minimum. However, since the masking effect is not utilized, the actual feeling of noise is not auditorily optimum.

In addition, in M. A. Kransner, "The critical band coder—digital encoding of the perceptual requirements of the auditory system," MIT, ICASSP 1980, a method for carrying out fixed bit allocation by utilizing auditory masking to obtain a necessary signal-to-noise ratio for each band is described. With this method, however, even in measuring characteristics by sine wave input, the resultant characteristic value is not so satisfactory because bit allocation is fixed.

To solve these problems, there has been proposed a high-efficiency coding method in which all bits that can be used for bit allocation are used in a divided manner for a fixed bit allocation pattern predetermined for each small block and for bit allocation dependent on the magnitude of the signal of each block, with the division ratio being dependent on a signal related to the input signal, so that the division rate for the fixed bit allocation pattern is made greater as the signal spectrum pattern becomes smoother.

According to this method, like sine wave input, in the case where energy is concentrated on a specified spectral signal component, a large number of bits are allocated to the block including that spectral signal component, thereby enabling significant improvement in overall signal-to-noise characteristic. In general, the human auditory sense is extremely sensitive to a signal having an acute spectral signal component. Therefore, improvement in signal-to-noise characteristic by using such method not only improves the numerical value in measurement but also is effective for improving the sound quality in consideration of the auditory sense.

There have been proposed various other bit allocation methods. Thus, if the model related to the auditory sense is made more precise and if the capability of the coding device is improved, auditorily more efficient coding can be carried out.

In these methods, it is typical to find a bit allocation reference value of a real number such as to precisely realize the signal-to-noise characteristic found by calculation, and use an integral value approximate thereto as the number of allocated bits.

In constituting an actual code string, it suffices to first encode quantization precision information and normalization coefficient information by a predetermined number of bits for each band to be normalized and quantized, and then encode spectral signal components that are normalized and quantized. In accordance with the ISO standard (ISO/IEC 11172-3:1993(E), 1993), there is described a high-efficiency coding system in which the number of bits expressing quantization precision information is set to vary depending on the band. In this case, such standard is set that the number of bits expressing quantization precision information becomes smaller in higher frequency bands.

Also, a method for determining quantization precision information from normalization coefficient information in the decoding device, instead of directly coding the quantization precision information, is known. In this method, since the relation between the normalization coefficient information and the quantization precision information is determined at the time when the standard is set, control with quantization precision based on an auditory model of higher grade cannot be introduced in the future. Also, in the case where the compression rate to be realized varies within a certain range, it is necessary to determine the relation between the normalization coefficient information and the quantization precision information for each compression rate.

In addition, a method for efficiently coding quantized spectral signal components by using variable length coding is known, as described in D. A. Huffman, "A Method for Construction of Minimum Redundancy Codes," Proc. I. R. E., 40, p.1098 (1952).

Moreover, in the specification and drawings of the PCT International Application Publication WO94/28633 by the present Assignee, a method for separating an auditorily important tone component from spectral signal components and coding the tone component separately from the other spectral signal components is proposed. Thus, it is possible to efficiently encode audio signals at a high compression rate without causing substantial deterioration of the audio signals in terms of auditory sense.

Each of the above-described coding methods can be applied to each channel of acoustic signals constituted by a plurality of channels. For example, it may be applied to an L channel corresponding to a left speaker and an R channel corresponding to a right speaker. It can also be applied to signals of (L+R/2) obtained by adding signals of the L channel and R channel. Alternatively, by using each of the above-described methods with respect to a signal of (L+R/2) and a signal of (L−R/2), efficient coding can be carried out. The quantity of data in coding signals of one channel is half the quantity of data in coding signals of two channels independently. Therefore, in recording signals onto a recording medium, there is often employed a technique of providing two mode, that is, a mode for recording monaural signals of one channel and a mode for recording stereo signals of two channels, and setting such standard that recording for a long period of time can be carried out with monaural signals.

As described above, methods for improving coding efficiency have been developed one after another. Therefore, by employing a standard including a newly developed coding method, recording for a longer period of time can be carried out, or audio signals of higher sound quality of the same recording time can be carried out.

In determining the standard as described above, there is often employed a technique of leaving in a signal recording medium a margin for enabling recording of flag information or the like related to the standard, in consideration of future change or extension of the standard. Specifically, for example, "0" is recorded as flag information of one bit in initial standardization, and "1" is recorded over the flag information in changing the standard. A reproducing device corresponding to the changed standard checks whether the flag information is "0" or "1". If the flag information is "1", it reads and reproduces signals from the signal recording medium on the basis of the changed standard. If the flag information is "0", and if the reproducing device corresponds also to the initially determined standard, it reads and reproduces signals from the signal recording medium on the basis of that standard. If the reproducing device does not correspond to the initial standard, reproduction of signals is not carried out.

However, once a reproducing device (hereinafter referred to as a former standard-adaptable reproducing device) capable of reproducing only signals recorded in conformity to a predetermined standard (hereinafter referred to as a "former standard" or "first coding method") becomes popular, the user of the device will be confused because it cannot reproduce signals recorded on a recording medium in conformity to an upper level standard (hereinafter referred to as a "new standard" or "second coding method") using a more efficient coding system.

Particularly, some reproducing devices (former standard-adaptable reproducing devices), manufactured at the time when the former standard was determined, ignore flag information recorded on the recording medium and reproduce all the signals recorded on the recording medium as being coded in conformity to the former standard. Specifically, even when signals are recorded on the recording medium in conformity to the new standard, all the former standard-adaptable reproducing devices cannot identify the conformity to the new standard. Therefore, if the former standard-adaptable reproducing device carries out reproduction by interpreting a recording medium on which signals in conformity to the new standard are recorded as being a recording medium on which signals in conformity to the former standard are recorded, there is a possibility that the device cannot operate normally or that troublesome noise is generated.

To solve this problem, the present Assignee has proposed, in the specification and drawings of the Japanese Publication of Unexamined Patent Application No.Hei 10-22935, a method for preventing confusion to the user of the device and generation of noise, by recording signals indicating that "a part of recorded signals cannot be reproduced by reproducing means adaptable only to this standard" on the basis of the former standard in the case where recording is carried out in conformity to an additional standard, that is, the new standard, and by preventing reproduction of signals except for the signals recorded on the basis of the former standard in the case where signals are reproduced by the former standard-adaptable reproducing device. In addition, in the specification and drawings of the Japanese Publication of Unexamined Patent Application No.Hei 10-22935, there is proposed a method for enabling easy recording with an inexpensive recording device adaptable to the new standard, by pre-recording a message signal based on the former standard onto a recording medium and manipulating the contents of reproduction management information in the case where recording is carried out in conformity to the new standard so that the message signal is reproduced in the case where reproduction is carried out by the former standard-adaptable reproducing device. In the specification and drawing of the same publication, there is also proposed a method for notifying the user of the former standard-adaptable reproducing device of which tune is actually recorded in conformity to the former standard, by reproducing a message signal in accordance with a portion where recording is carried out in conformity to the new standard in the case where reproduction is carried out by the former standard adaptable reproducing device.

In these methods, however, the recorded sounds cannot be actually reproduced by the former standard-adaptable reproducing device. Therefore, the present Assignee has proposed, in the specification and drawings of the Japanese Publication of Unexamined Patent Application No.Hei 9-42514, a coding method for coding signals of multiple channels for each frame the size of which cannot be controlled by the encoder, in which a signal of a channel to be reproduced by the former standard adaptable reproducing device is coded with a smaller number of bits than the maximum number of bits that can be allocated in the frame so that a signal of another channel is coded in a free area in the frame thus provided, thereby enabling reproduction of signals of a small number of channels by the former standard-adaptable reproducing device, while the new standard-adaptable reproducing device is used to enable reproduction of signals of a greater number of channels. In this method, the coding method for the signals of the channel that are not reproduced by the former standard-adaptable reproducing device is made more higher in coding efficiency than the coding method of the former standard, thereby enabling reduction in deterioration of sound quality due to coding of multi-channel signals. In this method, on the assumption that an area that can be reproduced by the former standard-adaptable reproducing device is an area 1 while an area that is not reproduced by the former standard-adaptable reproducing device is an area 2, if a signal A=(L+R)/2 is recorded in the area 1 while a signal B=(L−R)/2 is recorded in the area 2, the former standard-adaptable reproducing device can reproduce a monaural signal A and the new standard-adaptable reproducing device can reproduce stereo signals L, R from channels A, B.

The method for coding and recording the signals of (L+R)/2 and (L−R)/2 and reproducing stereo signals is disclosed in, for example, James D. Johnston, "Perceptual Transform Coding of Wide-band Stereo Signals," ICASSP 89, pp. 1993–1995.

However, in reproducing stereo signals by using these methods, quantization noise generated by coding may cause some trouble, depending on the type of the stereo signals.

FIGS. 1A to 1H show the states of quantization noise generated in the case where general stereo signals are coded, decoded, and reproduced in these methods.

FIGS. 1A and 1B show time base waveforms of a left channel component (L) of a stereo signal and a right channel component (R) of the stereo signal, respectively. FIGS. 1C and 1D show time base waveforms of signals obtained by converting the channels of L and R channel components to (L+R)/2 and (L−R)/2, respectively. In FIGS. 1C and 1D, (L+R)/2 is expressed as A and (L−R)/2 is expressed by B. In general, since there is strong correlation between the respective channels of the stereo signal, the signal level of B=(L−R)/2 is significantly lower than that of the original signal L or R.

FIGS. 1E and 1F show the states of quantization noise generated in coding the signals of (L+R)/2=A and (L−R)/2=B by the high efficiency coding method and then decoding the signals, respectively. In FIGS. 1E and 1F, N1 and N2 express time base waveforms of quantization noise components generated in coding the signals of (L+R)/2=A and (L−R)/2=B, respectively. A signal obtained by coding and decoding (L+R)/2=A can be expressed as A+N1, and a signal obtained by coding and decoding (L−R)/2=B can be expressed as B+N2. In the high efficiency coding method, the level of the quantization noise often depends on the original signal level. In this case, the signal level N2 is significantly lower than that of N1.

FIGS. 1G and 1H show the states where the respective channels of the stereo signal are separated from the signal waveforms of (A+N1) and (B+N2). By adding the signals of (A+N1) and (B+N2), the R channel component is eliminated and only the L component can be taken out. On the other hand, by subtracting the signal of (B+N2) from (A+N1), the L channel component is eliminated and only the R channel component can be taken out.

The quantization noise components N1 and N2 remain in the form of (N1+N2) or (N1−N2). However, since the level of N2 is significantly lower than that of N1, there is no particular problem in terms of auditory sense.

Meanwhile, FIGS. 2A to 2H similarly show the states of quantization noise with respect to a stereo signal such that the signal level of the right channel (R) is much lower than the signal level of the left channel (L). FIGS. 2A and 2B show time base waveforms of the left channel component (L) of the stereo signal and the right channel component (R) of the stereo signal, respectively. FIGS. 2C and 2D show time base waveforms of signals obtained by converting the channels of the L and R channel components to (L+R)/2 and (L−R)/2, respectively. In FIGS. 2C and 2D, similar to FIGS. 1C and 1D, (L+R)/2 is expressed as A and (L−R)/2 is expressed as B. In this example, the signal level of the R channel component is low and there is no correlation between the channels. Therefore, the signal level of B=(L−R)/2 is not low and this signal becomes rather proximate to A=(L+R)/2.

FIGS. 2E and 2F, similar to FIGS. 1E and 1F, show the states of quantization noise generated in coding the signals of (L+R)/2=A and (L−R)/2=B by the high efficiency coding method and then decoding the signals, respectively. In FIGS. 2E and 2F, N1 and N2 show time base waveforms of quantization noise components generated in coding the signals of (L+R)/2=A and (L−R)/2=B, respectively. Similar to FIGS. 1E and 1F, a signal obtained by coding and decoding (L+R)/2=A can be expressed as A+N1, and a signal obtained by coding and decoding (L−R)/2=B can be expressed as B+N2.

FIGS. 2G and 2H, similar to FIGS. 1G and 1H, show the states where the respective channels of the stereo signal are separated from the signal waveforms of (A+N1) and (B+N2). By adding the signals (A+N1) and (B+N2), the R channel component is eliminated and only the L component can be taken out. On the other hand, by subtracting the signal of (B+N2) from (A+N1), the L channel component is eliminated and only the R channel component can be taken out.

In this example of FIG. 2, too, the quantization noise components N1 and N2 remain in the form of (N1+N2) or (N1−N2). In this example, however, since the signal level of the R channel component is very low, the quantization noise component of (N1−N2) cannot be masked by the R channel component, and the quantization noise on the side of the R channel might be heard.

SUMMARY OF THE INVENTION

In view of the foregoing, it is an object of the present invention to provide a coding method and device, a decoding method and device, and a recording medium such that quantization noise generated by coding can be restrained to the minimum level to reduce deterioration in sound quality, in coding and decoding, for realizing multi-channel capability by a new standard extension while enabling reproduction by the former standard-adaptable reproducing device.

That is, in accordance with a coding/decoding method consistent with the present invention for realizing multi-channel capability by a new standard extension while enabling reproduction by a former standard-adaptable reproducing device, a channel signal of an extension part is optimally selected in accordance with an input signal and the quantization noise generated by coding is restrained to the minimum level so as to reduce deterioration in sound quality.

In accordance with methods consistent with the present invention, a coding method is provided. The coding method includes the steps of generating a first signal from signals of a plurality of input channels. Signal levels of a part of the plurality of input channels and the other channels are found. Either one of a second signal consisting only of a signal of the part of the channels or a second signal generated from signals of the plurality of input channels is selected based on the signal levels. The first signal and the selected second signal are coded.

In accordance with devices consistent with the present invention, a coding device is provided. The coding device includes a first signal generating means for generating a first signal from signals of a plurality of input channels. A second signal generating means is for selecting, on the basis of signal levels of a part of the plurality of input channels and the other channels, either one of a second signal consisting only of a signal of the part of the channels and a second signal generated from signals of the plurality of input channels. A coding means is for coding the first signal and the selected second signal.

In accordance with methods consistent with the present invention, a decoding method is provided. The decoding method includes separating from a code string a first coded signal, a second coded signal, and constituent information indicating a constituent state of a channel signal constituting the second coded signal. The separated first and second coded signals, respectively, are decoded to generate first and second signals. Restoration processing is selected for generating a plurality of channel signals from the first and second signals on the basis of the constituent information.

In accordance with methods consistent with the present invention, another decoding method is provided. The decoding method includes separating first and second coded signals from a code string including the first and second coded signals, the first coded signal being generated from signals of a plurality of channels and coded, the second coded signal being selected and coded from a second signal consisting only of a signal of a part of the plurality of channels and a second signal generated from signals of the plurality of channels on the basis of signal levels of the part of the channels and other channels. The separated first and second coded signals, respectively, are decoded. The signals of the plurality of channels are restored from the decoded first and second signals.

In accordance with devices consistent with the present invention, a decoding device is provided. The decoding device includes a separating means for separating from a code string a first coded signal, a second coded signal, and constituent information indicating a constituent state of a channel signal constituting the second coded signal. A decoding means is for decoding the separated first and second coded signals, respectively, to generate first and second signals. A control means is for selecting restoration processing for generating a plurality of channel signals from the first and second signals on the basis of the constituent information.

In accordance with devices consistent with the present invention, another decoding device is provided. The decoding device includes a separating means for separating first and second coded signals from a code string including the first and second coded signals, the first coded signal being generated from signals of a plurality of channels and coded, the second coded signal being selected and coded from a second signal consisting only of a signal of a part of the plurality of channels and a second signal generated from signals of the plurality of channels on the basis of signal levels of the part of the channels and the other channels. A decoding means is for decoding the separated first and second coded signals, respectively. A restoring means is for restoring the signals of the plurality of channels from the decoded first and second signals.

BRIEF DESCRIPTION OF THE DRAWINGS

FIGS. 1A to 1H illustrate the states of quantization noise generated in the case where a general stereo signal is coded, decoded, and reproduced by a conventional technique.

FIGS. 2A to 2H illustrate the states of quantization noise generated in the case where a stereo signal such that the signal level of the right channel (R) is much lower than the signal level of the left channel (L) is coded, decoded, and reproduced by the conventional technique.

DETAILED DESCRIPTION OF THE PRESENTLY PREFERRED EMBODIMENTS

Preferred embodiments of the present invention will now be described with reference to the drawings. First, FIG. 3 shows the schematic structure of a an exemplary compressed data recording and/or reproducing system embodying aspects of the present invention.

Figure 3:
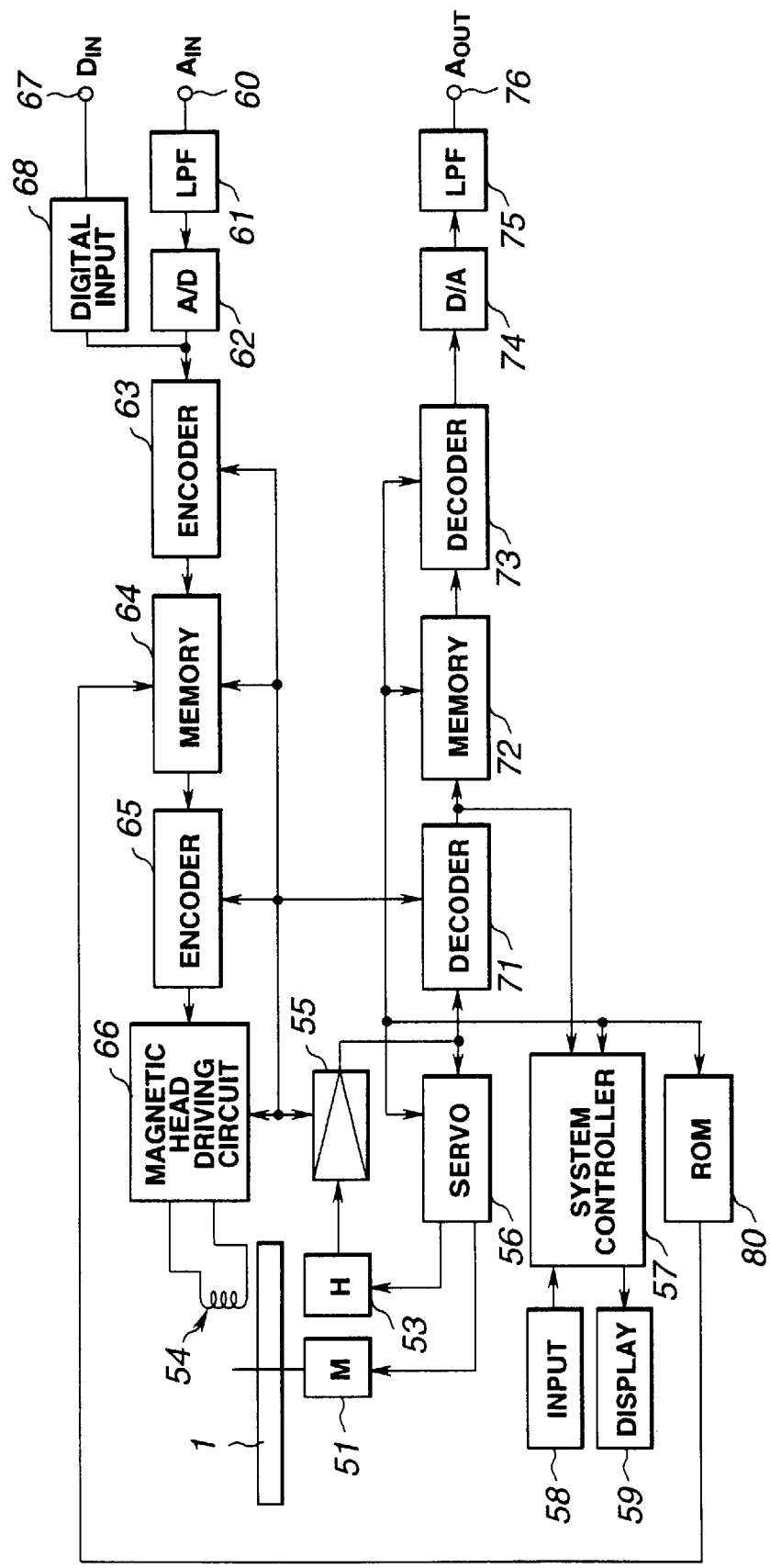
FIG. 3 is a block circuit diagram showing an example of the structure of a recording and/or reproducing system embodying aspects of the present invention.

In the compressed data recording and/or reproducing system of FIG. 3, a magneto-optical disc 1 which is rotationally driven by a spindle motor (M) 51 is used as a recording medium. When recording data onto the magneto-optical disc 1, a modulation magnetic field in accordance with recording data is applied by a magnetic head 54 while a laser beam is radiated by an optical head (H) 53 to carry out so-called magnetic field modulation recording such that data is recorded along a recording track on the magneto-optical disc 1. To reproduce the data, the recording track on the magneto-optical disc 1 is traced with a laser beam by the optical head 53 to carry out reproduction in a magneto-optical manner.

The optical head 53, which is operably configured to produce a laser light beam may comprise a laser diode, optical components such as a collimator lens, an objective lens, a polarization beam splitter and a cylindrical lens, and a photodetector having a light-receiving section of a predetermined pattern. This optical head 53 may be positioned facing the magnetic head 54 via the magneto-optical disc 1. When data is to be recorded onto the magneto-optical disc 1, the magnetic head 54 is driven by a magnetic head driving circuit 66 of the compressed data recording and/or reproducing system, as later described, to apply a modulation magnetic field in accordance with recording data while a laser beam is radiated to a target track on the magneto-optical disc 1 by the optical head 53, thus carrying out thermomagnetic recording using a magnetic field modulation method. Also, the optical head 53 detects a reflected light of the laser beam radiated to the target track. The optical head 53 also detects a focusing error by, for example, a so-called astigmatic method, and detects a tracking error by, for example, a so-called push-pull method. When data is to be reproduced from the magneto-optical disc 1, the optical head 53 detects the focusing error and tracking error, and at the same time, detects the difference in polarization angle (Kerr rotation angle) of the reflected light from the target track of the laser beam, thus generating a reproduction signal from the data on the magneto-optical disc.

The reproduction signal or output of the optical head 53 is supplied to an RF circuit 55. This RF circuit 55 extracts and supplies the focusing error signal and tracking error signal from the output of the optical head 53 to a servo control circuit 56. At the same time, the RF circuit 55 binarizes the reproduction signal and supplies the resultant signal to a decoder 71 of the compressed data recording and/or a reproducing system, as later described.

The servo control circuit 56 may comprise a focusing servo control circuit, a tracking servo control circuit, a spindle motor servo control circuit, and a sled servo control circuit. The focusing servo control circuit carries out focusing control of the optical system of the optical head 53 so that the focusing error signal becomes zero. The tracking servo control circuit carries out tracking control of the optical system of the optical head 53 so that the tracking error signal becomes zero. In addition, the spindle motor servo control circuit controls the spindle motor 51 so as to rotationally drive the magneto-optical disc 1 at a predetermined rotation speed (for example, a constant linear velocity). The sled servo control circuit moves the optical head 53 and the magnetic head 54 to the position of the target track of the magneto-optical disc 1 designated by a system controller 57. The servo control circuit 56, thus carrying out various control operations, sends information indicating the operation state of each part controlled by this servo control circuit 56 to the system controller 57. In addition, the spindle motor servo control circuit controls the spindle motor 51 so as to rotationally drive the magneto-optical disc 1 at a predetermined rotational speed (for example, a constant linear velocity). The sled servo control circuit moves the optical head 53 and the magnetic head 54 to the position of the target track of the magneto-optical disc 1 designated by a system controller 57. The servo control circuit 56, thus carrying out various control operations, sends information indicating the operation state of each part controlled by this servo control circuit 56 to the system controller 57.

The system controller 57 is operably connected to a key input operating section 58 and a display section (display) 59. The system controller 57 carries out control of the recording system and the reproducing system in accordance with operation input information from the key input operating section 58. Also, the system controller 57 manages a recording position and a reproducing position on the recording track traced by the optical head 53 and the magnetic head 54, on the basis of sector-based address information reproduced by header time or subcode Q-data from the recording track of the magneto-optical disc 1. In addition, the system controller 57 carries out control to display the reproduction time on the display section 59, on the basis of the data compression rate of this compressed data recording and/or reproducing system and reproducing position information on the recording track.

In this display of the reproduction time, actual time information is found by multiplying sector-based address information (absolute time information) reproduced by the so-called time header or so-called subcode Q-data from the recording track of the magneto-optical disc 1, by the reciprocal of the data compression rate (for example, 4 in the case of 1/4 compression), and this actual time information is displayed on the display section 59. At the time recording, too, if the absolute time information is pre-recorded (pre-formatted) on the recording track of the magneto-optical disc, it is possible to display the current position in the form of the actual recording time by reading the pre-formatted absolute time information and multiplying the absolute time information by the reciprocal of the data compression rate.

In the recording system or portion of this compressed data recording and/or reproducing system, an analog audio input signal A in present on an input terminal 60 is supplied through a low-pass filter (LPF) 61 to an A/D converter 62. A/D converter 62 quantizes the analog audio input signal A in to produce a corresponding digital audio signal. The digital audio signal obtained from the A/D converter 62 is supplied to an ATC (adaptive transform coding) encoder 63. Also, a digital audio input signal Din present on an input terminal 67 is supplied to the ATC encoder 63 through a digital input interface circuit (digital input) 68. The ATC encoder 63 is adapted for carrying out bit compression (data compression) processing in accordance with a predetermined data compression rate, with respect to digital audio PCM data of a predetermined transfer speed obtained by quantization of the input signal A in by the A/D converter 62. Compressed data (ATC data) outputted from the ATC encoder 63 is supplied to a memory 64. For example, in the case where the data compression rate is 1/8, the data transfer speed here is reduced to 1/8 (9.375 sectors/sec) of the data transfer speed (75 sectors/sec) of the standard CD-DA format.

The memory 64 has its data write and read operation controlled by the system controller 57, and is used as a buffer memory for temporarily storing the ATC data supplied from the ATC encoder 63 and recording the ATC data onto the disc, if necessary. Specifically, in the case where the data compression rate is 1/8, the compressed audio data supplied from the ATC encoder 63 has its data transfer speed reduced to 1/8 of the data transfer speed (75 sectors/sec) of the standard CD-DA format, that is, 9.375 sectors/sec, and this compressed data is continuously written into the memory 64. With respect to this compressed data (ATC data), it suffices to carry out recording of one sector for every eight sectors as described above. However, since such recording for every eight sectors is virtually impossible, recording of continuous sectors as later described is carried out. This recording is carried out in a burst-like manner with a pause period at the same data transfer speed (75 sectors/sec) as that of the standard CD-DA format, using a cluster consisting of a predetermined number of sectors (for example, 32 sectors plus several sectors) as a recording unit.

That is, in the memory 64, the ATC audio data of the data compression rate of 1/8 which is continuously written at the low transfer speed of 9.375 (=75/8) sectors/sec in accordance with the bit compression rate is read out as recording data in a burst-like manner at the transfer speed of 75 sectors/sec. With respect to this data read out to be recorded, the overall data transfer speed including the recording pause period is the low speed of 9.375 sectors/sec, but the instantaneous data transfer speed within the time period of recording operation in a burst-like manner is the standard transfer speed of 75 sectors/sec. Therefore, when the rotational speed of the disc is equal to the speed of the standard CD-DA format (that is, a constant linear velocity), recording is carried out with the same recording density and storage pattern as in the CD-DA format.

The ATC audio data, that is, the recording data read out from the memory 64 in a burst-like manner at the (instantaneous) transfer speed of 75 sectors/sec is supplied to an encoder 65. In a data string supplied from the memory 64 to the encoder 65, a unit that is continuously recorded by one recording operation is a cluster consisting of a plurality of sectors (for example, 32 sectors) and several sectors for cluster connection arranged before and after the cluster. The sectors for cluster connection are set to be longer than the interleave length in the encoder 65 so as not to affect data of other clusters even when interleaved.

The encoder 65 carries out coding processing (parity addition and interleave processing) for error correction and EFM coding processing, with respect to the recording data supplied from the memory 64 in a burst-like manner as described above. The recording data on which coding processing is carried out by the encoder 65 is supplied to the magnetic head driving circuit 66. This magnetic head driving circuit 66 is connected with the magnetic head 54, and drives the magnetic head 54 so as to apply a modulation magnetic field in accordance with the recording data to the magneto-optical disc 1.

The system controller 57 carries out memory control as described above with respect to the memory 64, and carries out control of the recording position so as to continuously record the recording data read out from the memory 64 in a burst-like manner in accordance with this memory control, onto the recording track of the magneto-optical disc 1. This control of the recording position is carried out by the system controller 57, by managing the recording position of the recording data read out from the memory 64 in a burst-like manner and supplying a control signal designating the recording position on the recording track of the magneto-optical disc 1 to the servo control circuit 56.

The reproducing system of the compressed data recording and/or reproducing system of FIG. 3 will now be described. This reproducing system is adapted for reproducing the recording data which is continuously recorded on the recording track of the magneto-optical disc 1 by the above-described recording system. The reproducing system has the decoder 71 to which a reproduction output obtained tracing the recording track of the magneto-optical disc 1 with a laser beam by the optical head 53 is binarized and supplied by the RF circuit 55. At this point, reading of not only the magneto-optical disc but also a read-only optical disc identical to a so-called compact disc (CD or Compact Disc, trademark) can be carried out.

The decoder 71 corresponds to the encoder 65 in the recording system. The decoder 71 carries out decoding processing as described above for error correction and EFM decoding processing with respect to the reproduction output binarized by the RF circuit 55, and reproduces the ATC audio data of the data compression rate of 1/8 at a transfer speed of 75 sectors/sec, which is faster than the normal transfer speed. The reproduction data obtained by this decoder 71 is supplied to a memory 72.

The memory 72 has its data write and read operation controlled by the system controller 57, and the reproduction data supplied from the decoder 71 at the transfer speed of 75 sectors/sec is written in a burst-like manner at the transfer speed of 75 sectors/sec. Also, from this memory 72, the reproduction data written in a burst-like manner at the transfer speed of 75 sectors/sec is continuously read out at a transfer speed of 9.375 sectors/sec corresponding to the data compression rate of 1/8.

The system controller 57 carries out memory control to write the reproduction data to the memory 72 at the transfer speed of 75 sectors/sec and to continuously read out the reproduction data from the memory 72 at the transfer speed of 9.375 sectors/sec. Also, the system controller 57 carries out memory control as described above with respect to the memory 72, and carries out control of the reproducing position so as to continuously reproduce the reproduction data written in a burst-like manner from the memory 72 in accordance with this memory control, from the recording track of the magneto-optical disc 1. This control of the reproducing position is carried out by the system controller 57, by managing the reproducing position of the reproduction data read out in a burst-like manner from the memory 72 and supplying a control signal designating the reproducing position on the magneto-optical disc 1 or the recording track of the magneto-optical disc 1 to the servo control circuit 56.

The ATC audio data obtained as the reproduction data continuously read out from the memory 72 at the transfer speed of 9.375 sectors/sec is supplied to an ATC decoder 73. This ATC decoder 73 corresponds to the ATC encoder 63 of the recording system, and reproduces digital audio data of 16 bits, for example, by carrying out data expansion (bit expansion) of the ATC data to eight times. The digital audio data from this ATC decoder 73 is supplied to a D/A converter 74.

The D/A converter 74 converts the digital audio data supplied from the ATC decoder 73 to an analog signal, thus forming an analog audio output signal A out. The analog audio signal A out obtained by the D/A converter 74 is outputted from an output terminal 76 via a low-pass filter (LPF) 75.

Next, high efficiency compression coding in accordance with the present invention will be described in detail. Specifically, a technique for high efficiency coding of an input digital signal in accordance with the present invention such as an audio PCM signal by using various techniques of subband coding (SBC), adaptive transform coding (ATC), and adaptive bit allocation will be described with reference to FIG. 4 and the subsequent drawings.

Figure 4:
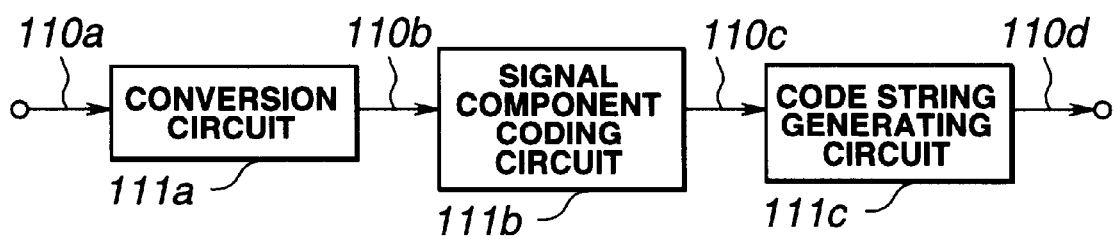
FIG. 4 is a block circuit diagram showing a specific example of the structure of the coding device of the system depicted in FIG. 3.

FIG. 4 depicts a block circuit diagram of the coding device (encoder 63 of FIG. 3) that may be used to carry out a method for coding acoustic waveform signals according to the present invention. As shown in FIG. 4, an inputted signal waveform 110*a* is converted to a signal frequency component 110*b* by a conversion circuit 111*a*, and each frequency component 110*b* thus obtained is coded by a signal component coding circuit 111*b*. After that, a code string generating circuit 111*c* generates a code string 110*d* from a coded signal 110*c* generated by the signal component coding circuit 111*b*.

Figure 5:
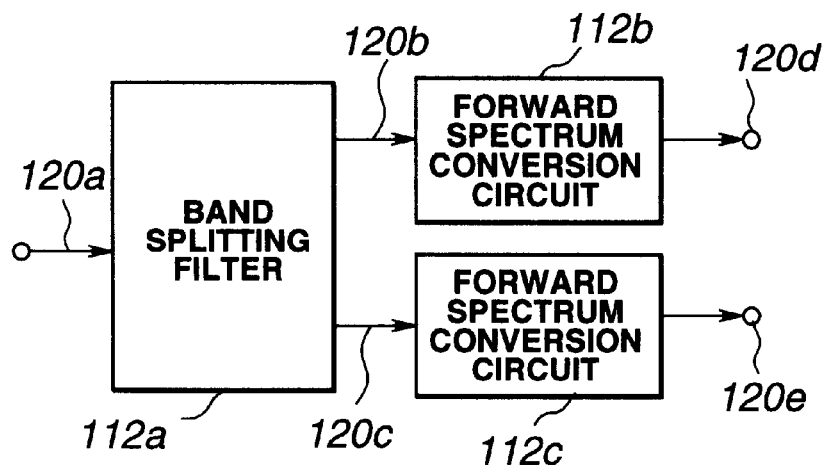
FIG. 5 is a block circuit diagram showing a specific example of the structure of a conversion circuit of the coding device depicted in FIG. 4.

In the conversion circuit 111*a*, as shown in FIG. 5, an input signal 120*a* is split into two bands by a band splitting filter 112*a*, and signals 120*b*, 120*c* of the two bands thus obtained are converted to spectral signal components 120*d*, 120*e* by forward spectrum conversion circuits 112*b*, 112*c* using MDCT or the like. The input signal 120*a* corresponds to the signal waveform 110*a* of FIG. 4, and the spectral signal components 120*d*, 120*e* correspond to the signal frequency component 110*b* of FIG. 4. In the conversion circuit 111*a* having the structure shown in FIG. 5, the bandwidth of the signals 120*b*, 120*c* split into two bands is 1/2 of the bandwidth of the input signal 120*a*, and the input signal 120*a* is thus thinned to 1/2. As a matter of course, various other circuits than this specific example can be considered as the conversion circuit 111*a*. For example, a circuit for converting the input signal directly to a spectral signal by MDCT, or a circuit for converting the input signal by DFT or DCT instead of MDCT may be employed. Also, it is possible to split the signal into band components by using a so-called band splitting filter. However, in the coding method according to the present invention, it is convenient to employ a method for converting the signal to frequency components by the above-described spectrum conversion in which a number of spectral components can be obtained with a relatively small amount of operation.

Figure 6:
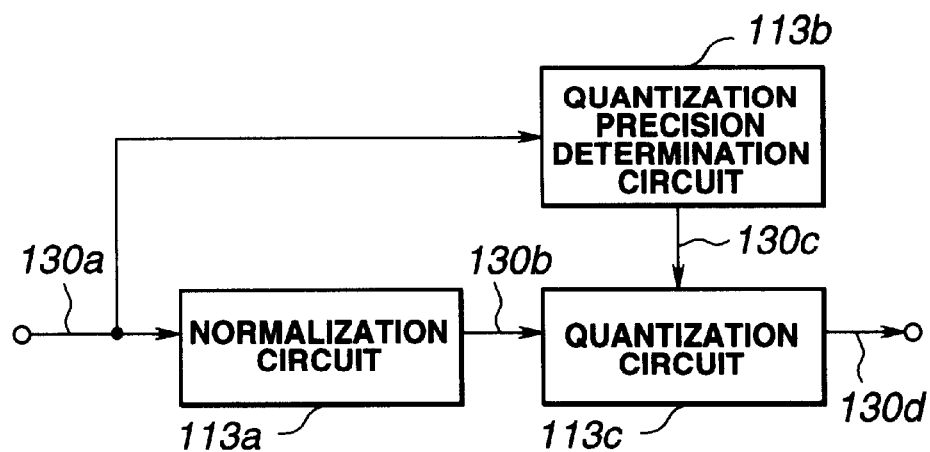
FIG. 6 is a block circuit diagram showing a specific example of the structure of a signal component coding circuit of the coding device depicted in FIG. 4.

In the signal component coding circuit 111*b*, as shown in FIG. 6, each signal component 130*a* is normalized for every predetermined band by a normalization circuit 113*a*, and quantization precision information 130*c* is calculated from the signal component 130*a* by a quantization precision determination circuit 113*b*. On the basis of the quantization precision information 130*c*, a quantization circuit 113*c* quantizes a normalized signal 130*b* from the normalization circuit 113*a*. Each signal component 130*a* corresponds to the signal frequency component 110*b* of FIG. 4, and an output signal 130*d* of the quantization circuit 113*c* corresponds to the coded signal 110*c* of FIG. 4. This output signal 130*d* includes normalization coefficient information in the normalization and the quantization precision information, in addition to the quantized signal component.

Figure 7:
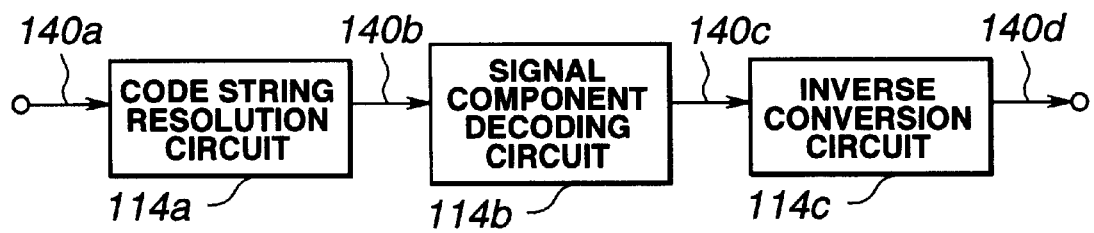
FIG. 7 is a block circuit diagram showing a specific example of the structure of a decoding device of the system depicted in FIG. 3.

On the other hand, in a decoding device (decoder 73 in the example of FIG. 3) for reproducing the audio signal from the code string generated by the above-described coding device, as shown in FIG. 7, a code 140*b* of each signal component is extracted from a code string 140*a* by a code string resolution circuit 114*a*, and each signal component 140*c* is restored from the code 140*b* by a signal component decoding circuit 114*b*. From this restored signal component 140*c*, an acoustic waveform signal 140*d* is reproduced by an inverse conversion circuit 114*c*.

In FIG. 7 an exemplary block circuit diagram of the decoding device (decoder 73 in the example of FIG. 3) is shown for reproducing the audio signal from the code string generated by the above-described coding device (e.g., encoder 63 in FIG. 3). As depicted in FIG. 7, a code 140*b* of each signal component is extracted from a code string 140*a* by a code string resolution circuit 114*a*, and each signal component 140*c* is restored from the code 140*b* by a signal component decoding circuit 114*b*. From this restored signal component 140*c*, an acoustic waveform signal 140*d* is reproduced by an inverse conversion circuit 114*c*.

Figure 8:
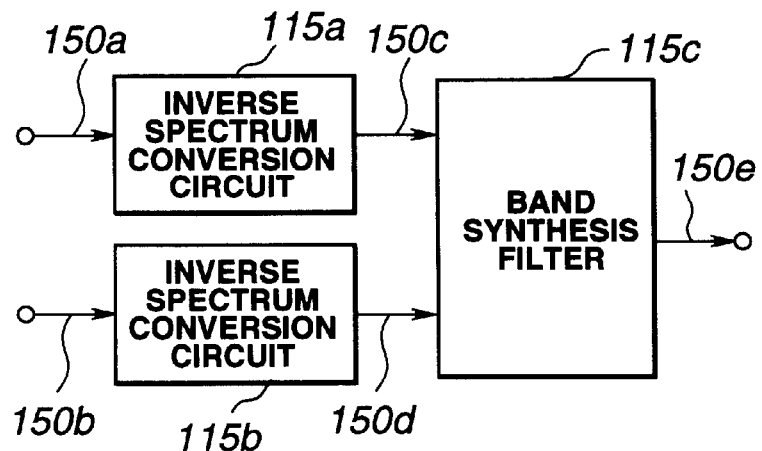
FIG. 8 is a block circuit diagram showing a specific example of the structure of a signal component decoding circuit of the decoding device depicted in FIG. 7.

FIG. 8 depicts an exemplary embodiment of the inverse conversion circuit 114*c* of the decoding device, which corresponds to the conversion circuit shown in FIG. 5. In the inverse conversion circuit 114*c* of FIG. 8, inverse spectrum conversion circuits 115*a*, 115*b* carry out inverse spectrum conversion of input signals 150*a*, 150*b* supplied thereto, respectively, thus restoring signals of respective bands. A band synthesis filter 115*c* synthesizes these band signals. The input signals 150*a*, 150*b* correspond to the signal 140*c* restored from each signal component signal by the signal component decoding circuit 114*b* of FIG. 7. An output signal 150*e* of the band synthesis filter 115*c* corresponds to the acoustic waveform signal 140*d* of FIG. 7.

Figure 9:
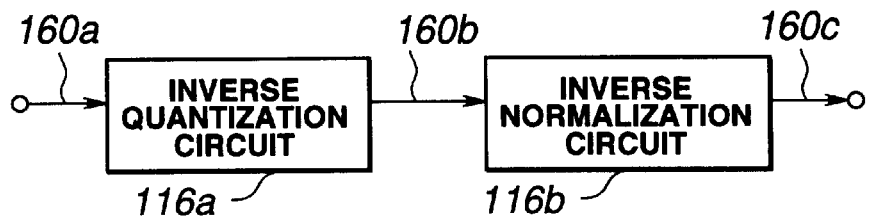
FIG. 9 is a block circuit diagram showing a specific example of the structure of a signal component decoding circuit of the decoding device depicted in FIG. 7.

FIG. 9 depicts an exemplary embodiment of the signal component decoding circuit 114*b* of FIG. 7. In this embodiment, the signal component decoding circuit 114*b* is adapted for carrying out inverse quantization and inverse normalization with respect to the code 140*b*, that is, the spectral signal, from the code string resolution circuit 114*a* of FIG. 7. In the signal component decoding circuit 114*a* shown in FIG. 9, an inverse quantization circuit 116*a* inversely quantizes an inputted code 160*a*, and an inverse normalization circuit 116*b* inversely normalizes a signal 160*b* obtained by the inverse quantization, thus outputting a signal component 160*c*. The code 160*a* corresponds to the code 140*b* from the code string resolution circuit 114*a* of FIG. 7, and the output signal component 160*a* corresponds to the signal component 140*c* of FIG. 7.

Figure 10:
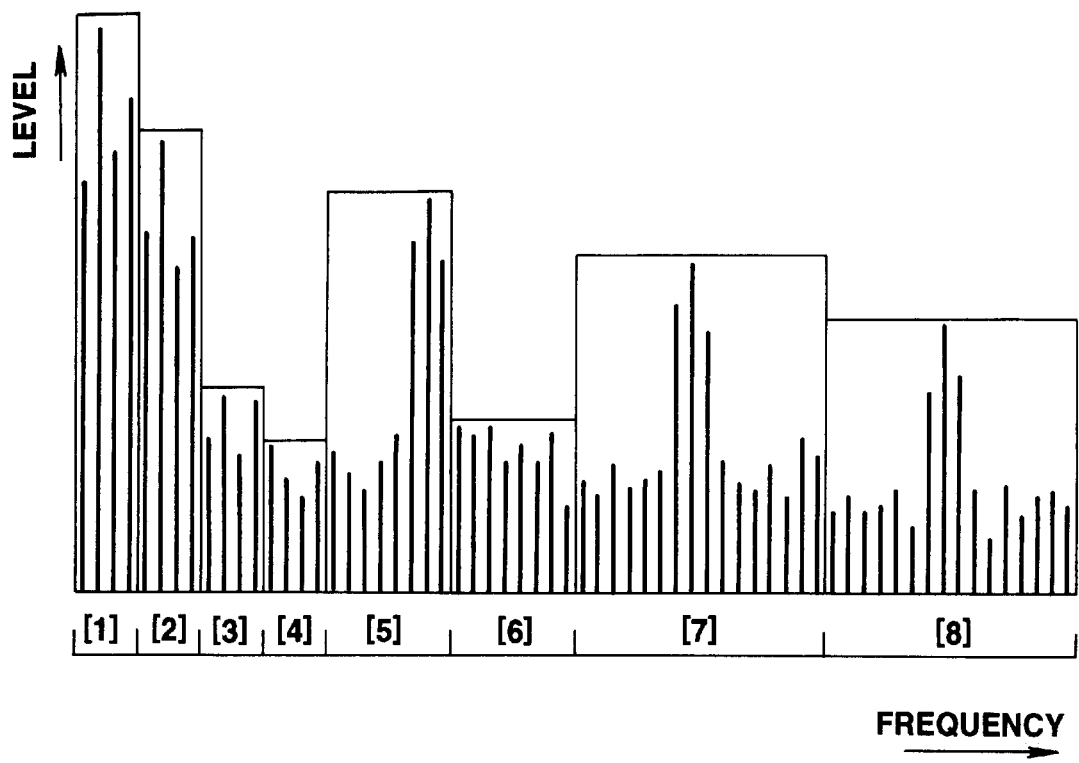
FIG. 10 illustrates an exemplary spectral signal produced by the conversion circuit of FIG. 5 and illustrating a coding method in accordance with the present invention.

FIG. 10 depicts an exemplary spectral signal (i.e. spectral (components 120*d* and 120*e*) produced by the conversion circuit shown in FIG. 5 of the above-described coding device. With respect to each spectral component of the spectral signal shown in FIG. 10, the absolute value of the spectral component by MDCT is shown with its level converted to [dB]. Specifically, in this signal coding device, the input signal is converted to 64 spectral signals for each predetermined conversion block, and these spectral signals are collected in eight bands (hereinafter referred to as coding units) indicated by [1] to [8] in FIG. 10, which are then normalized and quantized. At this point, by varying the quantization precision for each coding unit depending on the way of the distribution of frequency components, auditorily efficient coding can be carried out with deterioration of sound quality limited to the minimum level.

Figure 11:
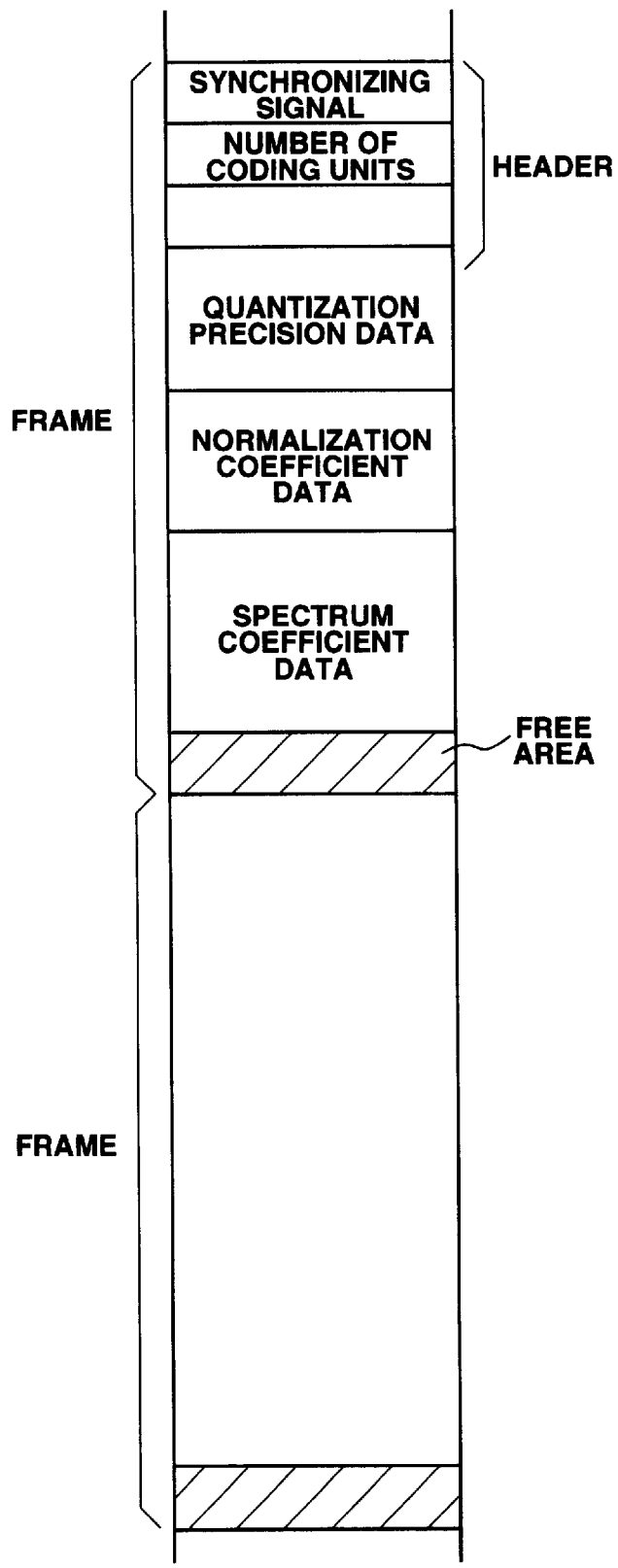
FIG. 11 illustrates the structure of a code string of a frame coded in accordance with the spectral signal depicted in FIG. 10.

FIG. 11 shows an example of the structure of code string 110*d* in the case where coding is carried out in accordance with the above-described method for producing the spectral signal of FIG. 10.

As shown in FIG. 11, information obtained by coding the data for restoring a spectral signal of each conversion block in accordance with a frame constituted by a predetermined number of bits arranged. At a leading portion (header portion) of each frame, information obtained by coding control data such as synchronizing signal and a coded coding unit by a predetermined number of bits is arranged. Subsequently, information obtained by coding quantization precision data and normalization coefficient data of each coding unit from a coding unit on the lower frequency side is arranged. Finally, information obtained by coding, from the lower frequency side is arranged. Finally, information obtained by coding, from the lower frequency side, spectrum coefficient data normalized and quantized on the basis of the above-mentioned normalization coefficient data and quantization precision data for each coding unit is arranged.

The number of bits actually required for restoring the spectral signal of this conversion block is determined by the number of coded coding units and the number of quantization bits indicated by the quantization precision information of each coding unit, and may vary from frame to frame. Only the number of required bits from the leading portion of each frame has meaning at the time of reproduction, and the remaining area of each frame becomes a free area, which does not affect reproduction signals. Normally, a greater number of bits are effectively used for improvement in sound quality, and the free area of each frame is made as small as possible.

As in this example, by coding each conversion block in accordance with the frame of a predetermined number of bits, the recording position of an arbitrary conversion block can be easily calculated in the case where this code string is recorded on a recording medium such as an optical disc. Therefore, so-called random access for starting reproduction at an arbitrary position can be easily realized.

Figure 12:
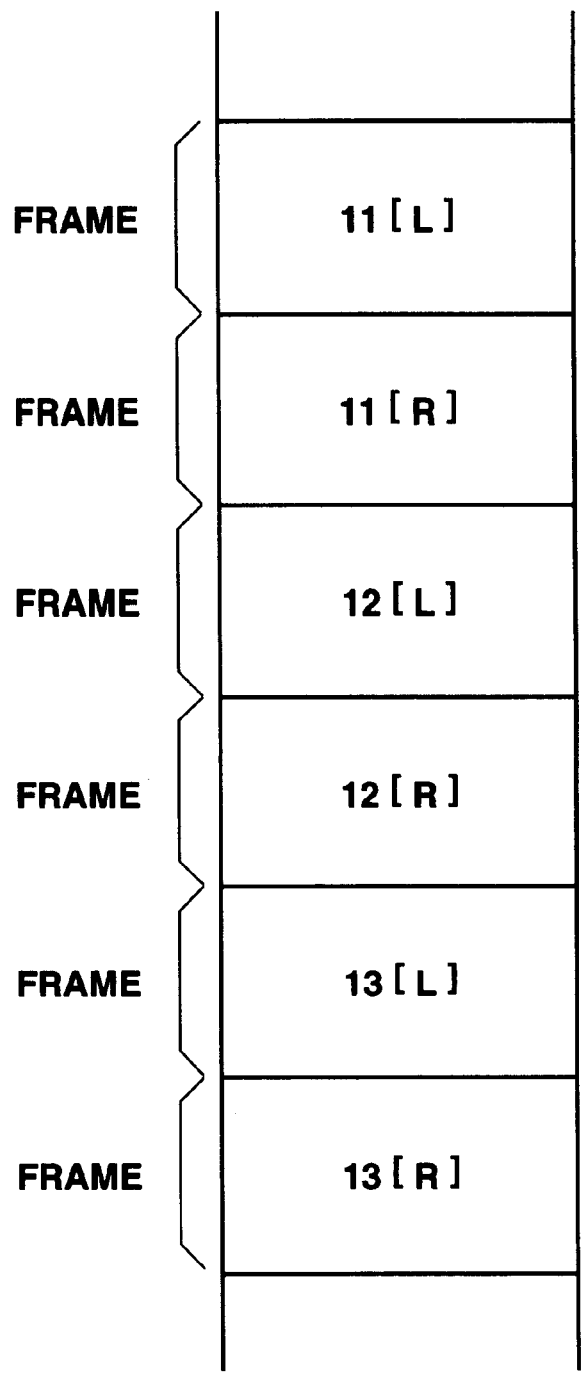
FIG. 12 illustrates an example of arrangement of L and R channels for each frame encoded in accordance with the present invention.
Figure 13:
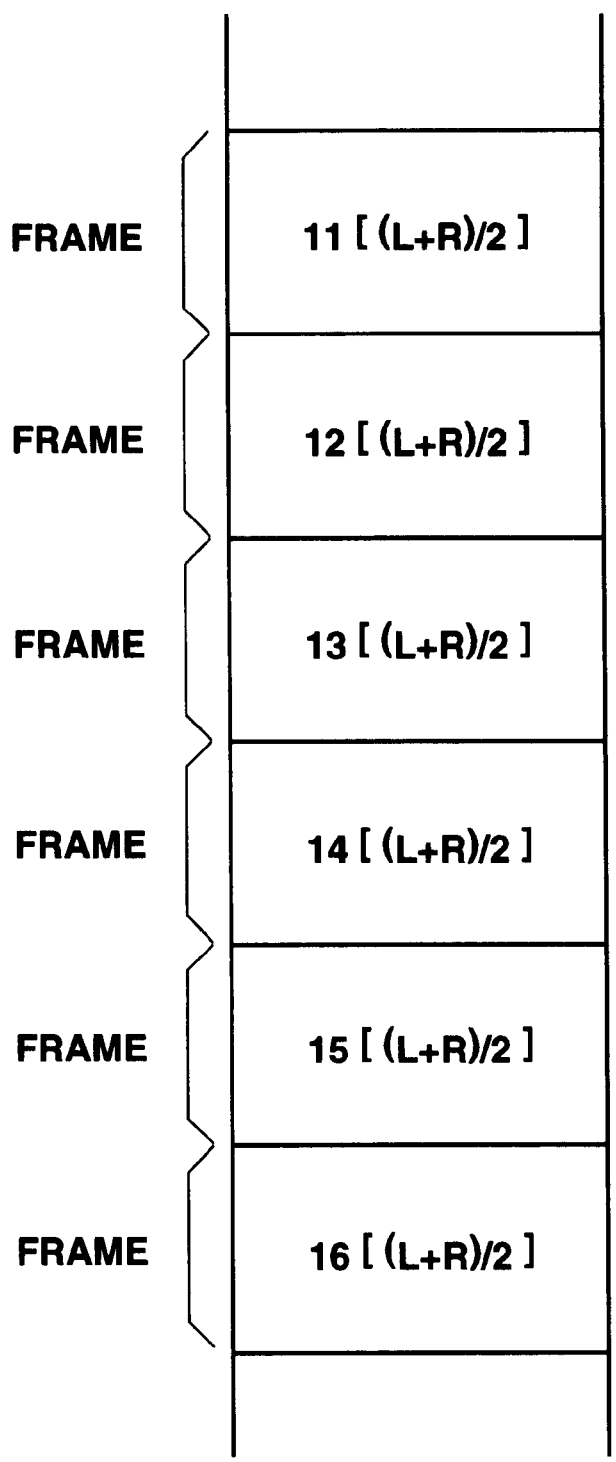
FIG. 13 illustrates an example arrangement of a channel of (L+R)/2 in a frame encoded in accordance with the present invention.

FIGS. 12 and 13 show examples of the recording format in the case where data of the frame shown in FIG. 11 is arranged on a recording medium, for example, in a time series manner. FIG. 12 shows an example in which signals of two channels of L (left) and R (right) are alternately arrange for each frame. FIG. 13 shows an example in which a signal of one channel (monaural signal generated from two channels of L, R) generated by processing signals of two channels of L, R by (L+R)/2 is arranged for each frame.

By employing the recording format as shown in FIG. 12, signals of two channels of L, R can be recorded onto the same recording medium. In the case where the recording format in which the signal of only (L+R)/2 channel is arranged for each frame as shown in FIG. 13 is employed, signal recording and reproduction for a double time can be carried out and reproduction can be easily carried out without complicating the reproducing circuit, in comparison with the recording format in which the two channels of L, R are alternately arranged for each frame as shown in FIG. 12.

On the assumption that the recording format as shown in FIG. 12 is referred to as a standard time mode, the recording format which enables recording and reproduction of signals for a long period of time with a small number of channels as shown in FIG. 13 can be referred to as a long time mode, which enables recording and reproduction for a time period double that of the standard time mode. In the example of FIG. 12, too, if only one monaural channel is recorded instead of the two channels of L, R with respect to each frame, signals can be recorded for a time period double the time in the case where the two channels of L, R are recorded. In this case, too, the mode can be referred to as the long time mode.

In the foregoing description, only the technique described with reference to FIG. 11 is described as the coding method. However, the coding efficiency of the coding method described with reference to FIG. 11 can be improved further.

For example, by using a so-called variable length coding technique in which a relatively short code length is allocated to a spectral signal having a high frequency of appearance among the quantized spectral signals while a relatively long code length is allocated to a spectral signal having a low frequency of appearance, the coding efficiency can be improved.

Also, by causing the predetermined conversion block in coding the input signal to be long, that is, by taking a long time block for spectrum conversion, the quantity of sub-information such as the quantization precision information and the normalization coefficient information can be relatively reduced per block, and the frequency resolution is improved. Therefore, the quantization precision on the frequency base can be controlled more finely, and the coding efficiency can be improved.

Moreover, in the specification and drawings of the PCT Application International Publication WO94/28633 by the present Assignee, there is proposed a method for separating a tone signal component which is auditorily important from spectral signal components and then coding the tone signal component separately from the other spectral signal components. By using this method, it is possible to efficiently code audio signals at a high compression rate without causing substantial deterioration in terms of auditory sense.

Figure 14:
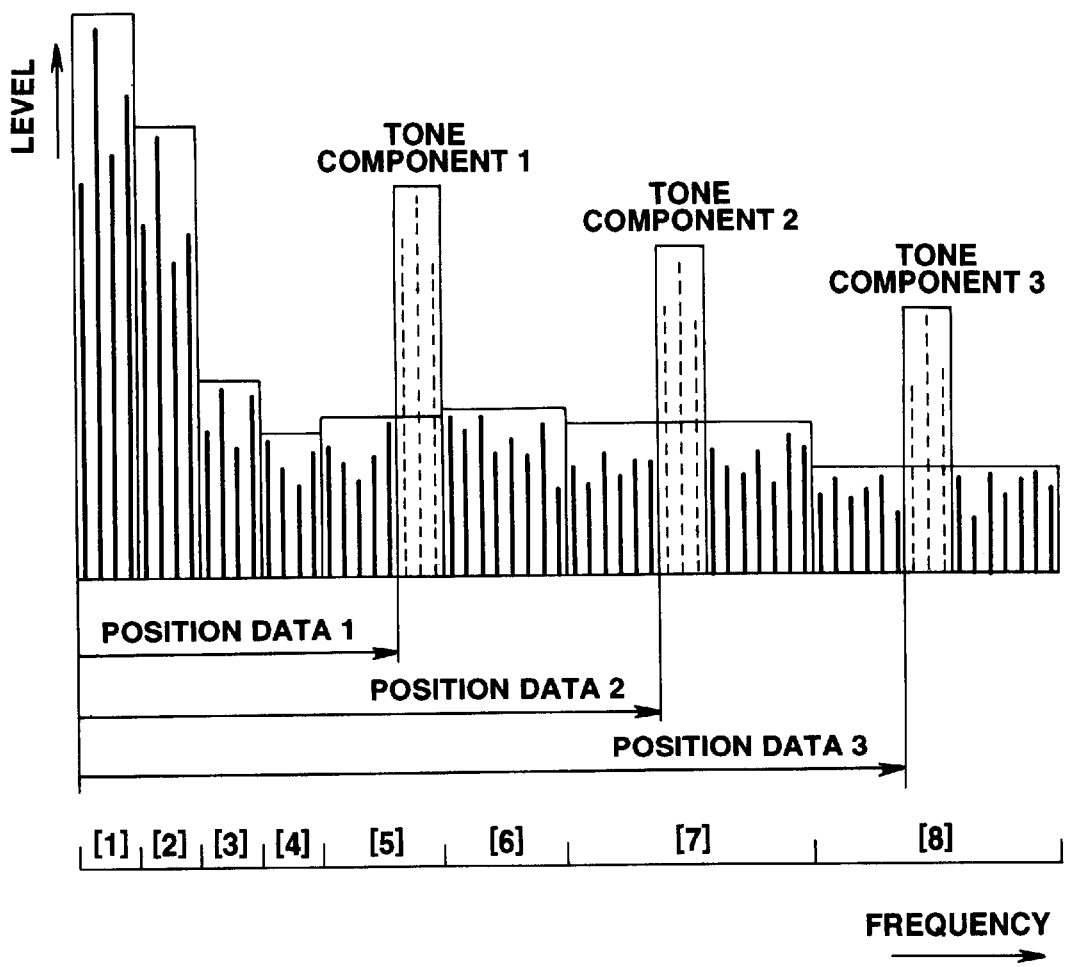
FIG. 14 illustrates a another spectral signal produced by the conversion circuit of FIG. 5 and illustrating another coding method for separately coding a tone component and a noise component as signal components in accordance with the present invention.

Referring to FIG. 14, the method for separating the tone signal component and separately coding the tone signal component will now be described. In the example of FIG. 14, the state of each of three tone components gathered as tone signal components is separated from other spectral signal components. Each tone signal component corresponding to each of these tone components is coded together with position data on the frequency base of each tone component.

In general, to prevention deterioration of sound quality, it is necessary to quantize, with high precision, each signal component of the tone component having energy concentrated on a small number of spectra. However, a spectrum coefficient in each coding unit (e.g., bands [1] to [8] in FIG. 14) after separating the tone component (that is, a non-tone spectral signal component) can be quantized with a relatively small number of steps, without deteriorating the sound quality in terms of auditory sense.

In FIG. 14, only a relatively small number of spectral signal components are shown for simplification of the drawing. However, with respect to the actual tone component, since energy is concentrated on several signal components within the coding unit constituted by tens of spectral signal components, the increase in data quantity due to separation of such tone components is relatively small. By separating the tone components, the coding efficiency can be improved as a whole.

Figure 15:
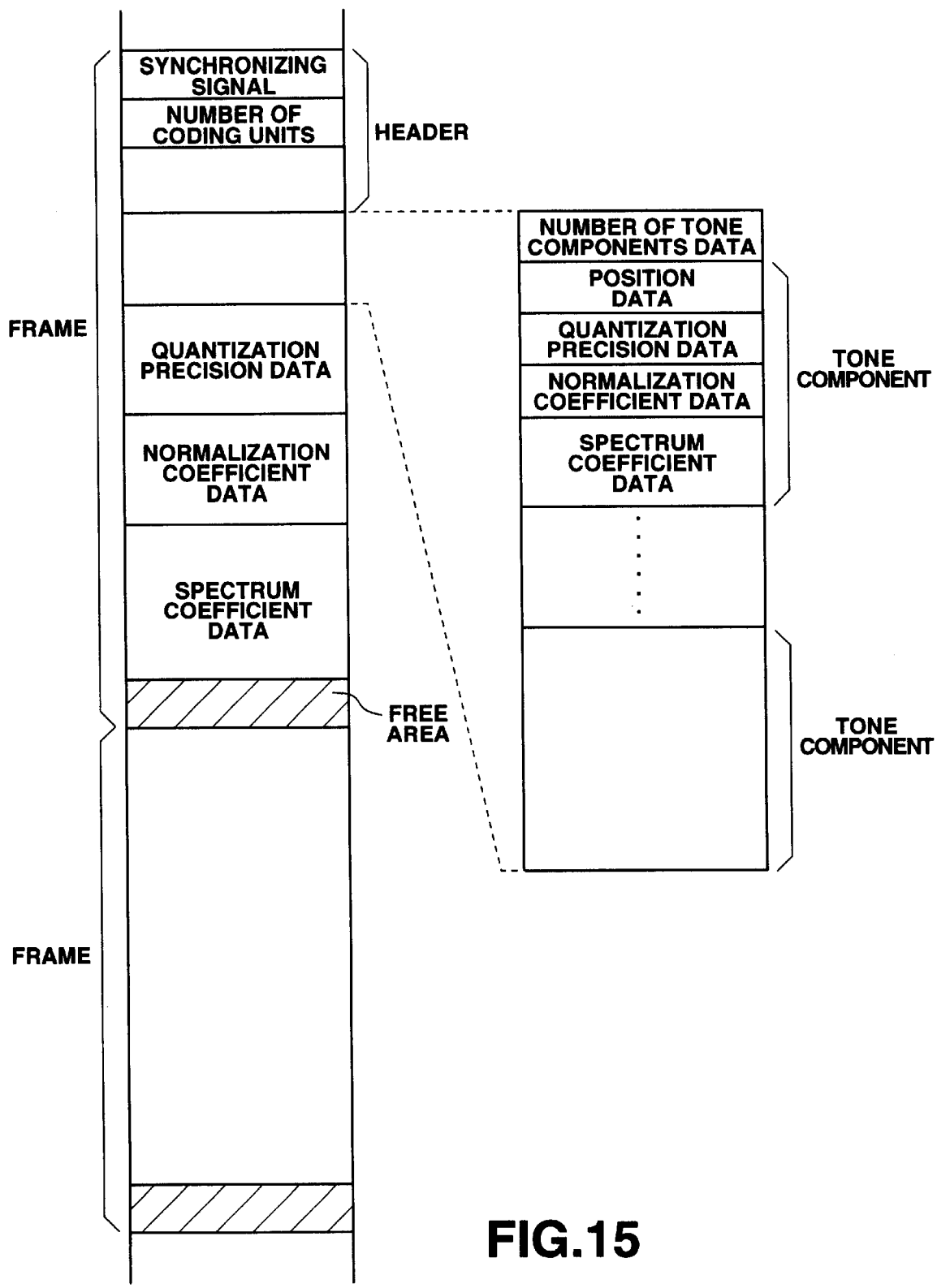
FIG. 15 illustrates the structure of a code string of a frame coded by the coding method for separately coding a tone component and a noise component as signal components in accordance with the present invention.

FIG. 15 shows an example of the structure of a code string (e.g. code string 110d of FIG. 4) in the case where coding is carried out by the method described with reference to FIG. 14. In this example, information obtained by coding control data such as a synchronizing signal and a coded coding unit by a predetermined number of bits is arranged at a leading portion of each frame as a header portion. Subsequently, information obtained by coding tone component data which is data related to each tone components is arranged.

As shown in FIG. 15, the tone component data includes the number of signal components coded within the tone component data as well as information obtained by quantization precision data, information obtained by coding normalization coefficient data, and normalized and information obtained by coding each quantized tone signal components (spectrum coefficient data).

Next to the tone component data, information obtained by coding data of the remaining signal (also referred to as noise signal component) as a result of subtracting the tone signal component from the original spectral signal components is arranged. In this portion, information obtained by coding quantization precision data and normalization coefficient data of each coding unit from the coding unit on the lower frequency side and information obtained by coding, from the coding unit on the lower frequency side, spectrum coefficient data (signal components other than the tone component) that is normalized and quantized on the basis of the normalization coefficient data and the quantization precision data for each coding unit are arranged. It is to be noted that variable length coding is carried out on the tone component and the spectral signal components (coefficient data) of the signal components other than the tone component.

Figure 16:
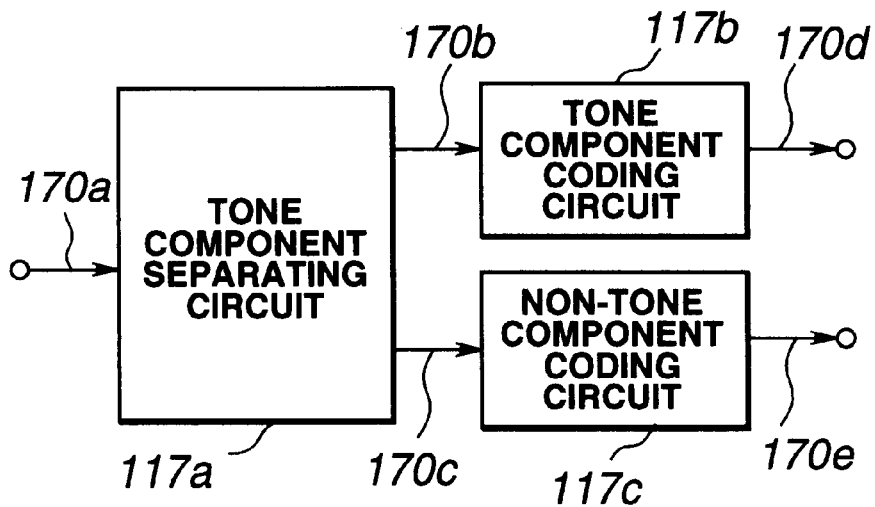
FIG. 16 is a block circuit diagram showing a specific example of the structure of a signal component coding circuit of the coding device depicted in FIG. 4 for separately coding a tone component and a noise component as signal components.

FIG. 16 shows a specific example of the signal component coding circuit 111b of FIG. 4 in the case where the tone signal component is to be separated from each signal component.

In the signal component coding circuit 111b shown in FIG. 16, a signal component 170a (110b) supplied from the conversion circuit 111a of FIG. 4 is sent to a tone component separating circuit 117a. The signal component 170a is separated into a tone signal component and other signal components (non-tone signal components). The tone signal component 170b is sent to a tone component coding circuit 117b, and the non-tone signal component is supplied to a non-tone component coding circuit 117c. The tone component coding circuit 117b and the non-tone component coding circuit 117c encode the signal components supplied thereto and output resultant output signals 170d and 170e, respectively. The tone component coding circuit 117b also carries out generation of each information constituting the tone component data of FIG. 15 at the same time as coding of the tone signal component. The structures for signal coding in the tone component coding circuit 117b and the non-tone component coding circuit 117c are the same as those in FIG. 6.

Figure 17:
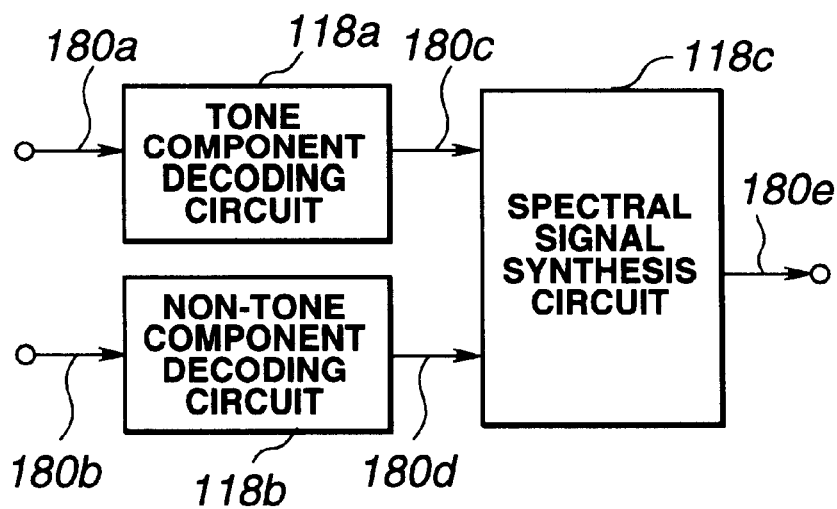
FIG. 17 is a block circuit diagram showing a specific example of the structure of a signal component decoding circuit of the decoding device depicted in FIG. 7 for decoding a signal which has its tone component and noise component separately coded as signal components.

FIG. 17 shows a specific example of the signal component decoding circuit 114b of FIG. 7 in the case where the tone signal component is separated from each signal component.

In the signal component decoding circuit 114b shown in FIG. 17, the code 140b supplied from the code string resolution circuit 114a of FIG. 7 includes the tone component data 180a and the non-tone signal component 180b, and these data and signal component are sent to corresponding tone component decoding circuit 118a and non-tone component decoding circuit 118b, respectively. The tone component decoding circuit 118a decodes the tone signal component from the tone component data as shown in FIG. 15 and outputs a resultant tone signal component 180c. The non-tone component decoding circuit 118b decodes the non-tone signal component and outputs a resultant non-tone signal component 180d. Both of these tone signal component 180c and non-tone signal component 180d are sent to a spectral signal synthesis circuit 118c. The spectral signal synthesis circuit 118c synthesizes the tone signal component and the non-tone signal component on the basis of the position data, and outputs a resultant signal component 180e. The structures for signal decoding in the tone component decoding circuit 118a and the non-tone component decoding circuit 118b are the same as those in FIG. 9.

Figure 18:
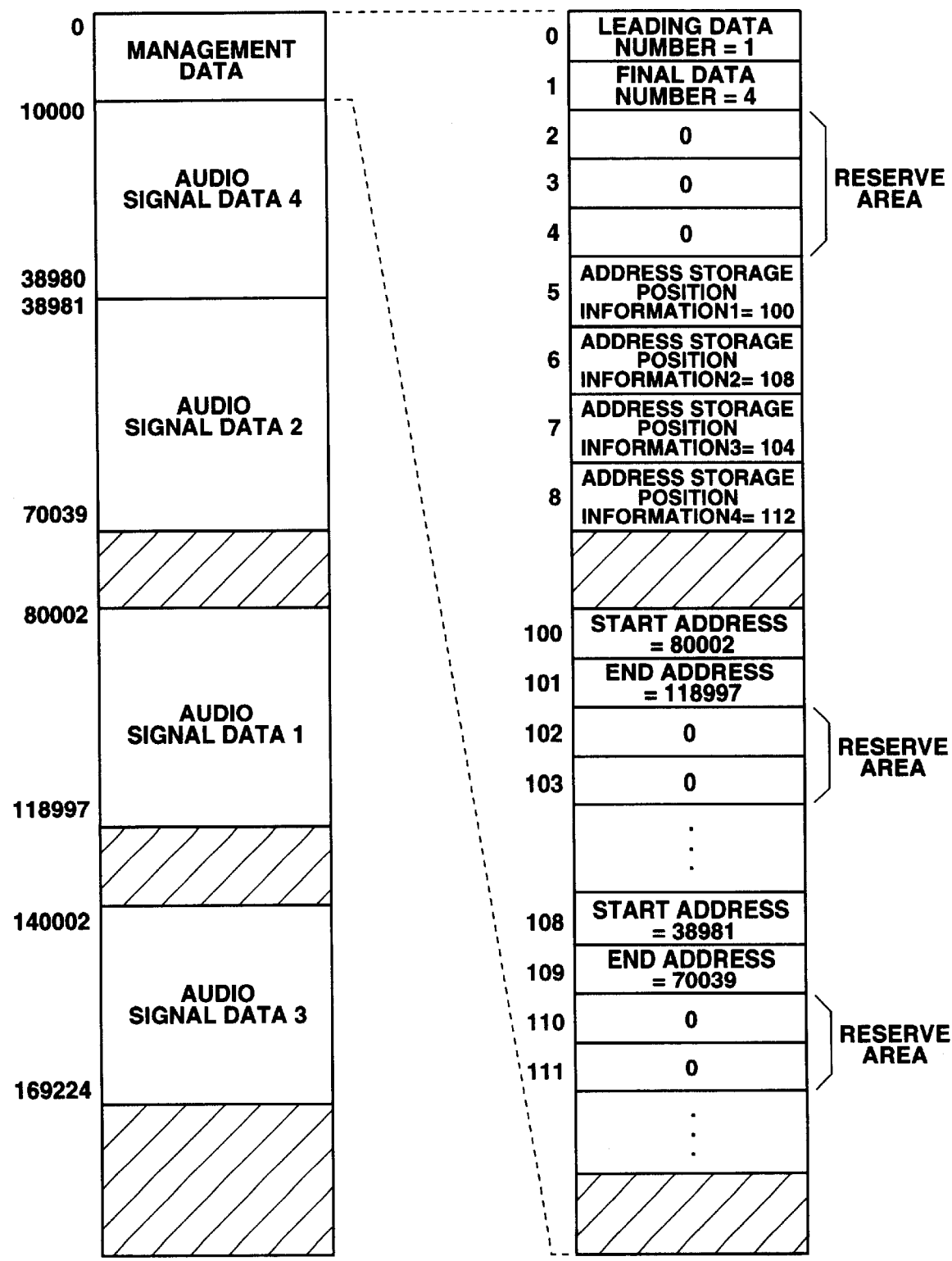
FIG. 18 illustrates a recording format in recording a code string of A codec.

FIG. 18 shows an exemplary format in the case where the signal coded in the foregoing manner is to be recorded onto, for example, a magneto-optical disc. In the example of FIG. 18, audio signal data for four units (four tunes) are recorded in total.

In FIG. 18, the audio signal data for four units in total and management data used in recording and reproducing the audio signal data are recorded on the disc. At addresses 0 and 1 in a management data area, a leading data number and a final data number are recorded, respectively. In the example of FIG. 18, 1 is recorded as the value of the leading data number, and 4 is recorded as the value of the final data number. Thus, it can be found that four units of audio signal data, that is, the first to fourth data, are recorded on this disc.

At addresses 5 to 8 in the management data area, address storage position information is recorded which indicates the position in the management data area where "data indicating where on the disc each audio signal data is recorded", that is, address information, is recorded. This address storage position information is recorded in the order of reproduction of the audio signal data (that is, in the order of playing of tunes). For example, the address storage position information for the audio signal data to be reproduced first is recorded at the address 5, and the address storage position information for the audio signal data to be reproduced second is recorded at the address 6. Using such management data, replacement of the reproduction order of the first and second audio signal data can be easily realized by replacing the contents of the addresses 5 and 6, instead of replacing the actual recording positions of the audio signal data. Also, in the management data area, a reserve area for enabling future extension is provided, where 0 data is recorded.

It is now assumed that a certain coding technique (hereinafter referred to as the former standard or A codec) is developed and used to standardize a recording format with respect to the disc and that a more efficient coding technique (hereinafter referred to as the new standard or B codec) obtained by extending the A codec is subsequently developed. In this case, a signal coded in accordance with the B codec can be recorded onto the same type of disc as a disc on which a signal is recorded by the A codec. If the signal of the B codec can be thus recorded similarly to the case of the A codec, signal recording onto the disc for a longer period of time can be realized and signal recording with higher sound quality can be realized. Therefore, the range of application of the disc is expanded, which is convenient.

If the coding method described with reference to FIG. 11 is considered as the A codec, the coding method using the so-called variable length coding technique for allocating a relatively short code length to a spectral signal having a high frequency of appearance among quantized spectral signals and allocating a relatively long code length to a spectral signal having a low frequency of appearance as described above can be considered as the B codec. Similarly, the coding method for relatively reducing the quantity of sub-information such as quantization precision information and normalization coefficient information so as to take a long conversion block length in coding an input signal as described above can be considered as the B codec. Also, the coding method for separating the spectral signal components into the tone component and the non-tone component and separately coding these components as described above can be considered as the B codec. In addition, a combination of these high efficiency coding methods can be considered as the B codec.

Figure 19:
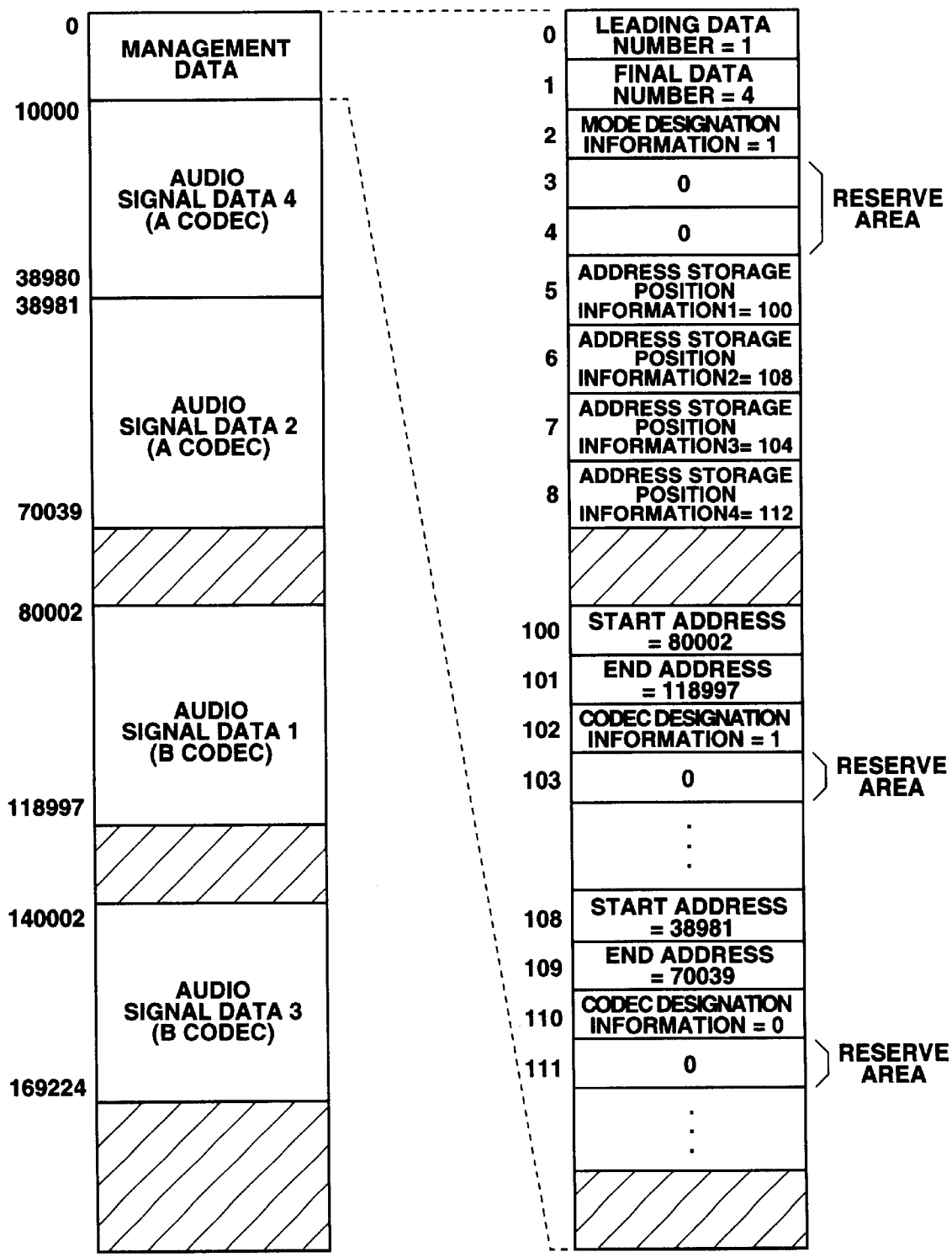
FIG. 19 illustrates a recording format in recording strings of A codec and B codec in accordance with the present invention.

In the case where the signal coded in accordance with the B codec extended from the A codec is to be recorded as described above, mode designation information as shown in FIG. 19 is recorded at an address 2, which was a reserve area in the disc only in conformity to the former standard (A codec) as shown in FIG. 18. The mode designation information indicates that recording based on the former standard (A codec) is carried out, when its value is 0. The mode designation information indicates that recording based on the A codec or B codec is carried out, when its value is 1. Therefore, if the value of the mode designation information is 1 at the time of reproduction, there is a possibility that recording based on the B codec is carried out on the disc.

Also, in the case where the signal of the B codec is to be recorded onto the disc, one of the reserve areas provided next to the area where address information (start address and end address) of each audio signal data as shown in FIG. 18 is recorded is used as an area for codec designation information. The codec designation information indicates that audio signal data designated by the address information including the start address and end address is coded on the basis of the former standard (A codec), when its value is 0. The codec designation information indicates that audio signal data designated by the address information is coded on the basis of the new standard (B codec), when its value is 1. Thus, the audio signal data coded in accordance with the A codec and the audio signal coded in accordance with the B codec can be recorded on the same disc in a mixed state, and the disc can be reproduced by a reproducing device which is also adaptable to the new standard (B codec), (hereinafter referred to as a new standard-adaptable reproducing device).

However, with respect to the disc on which data of the A codec and B codec are recorded in a mixed state as shown in FIG. 19, whether data is recorded in accordance with the A codec, that is, the former standard, or in accordance with the B codec, that is, the new standard, cannot be discriminated from its appearance. Therefore, there is a possibility that the user reproduces this disc by the former standard-adaptable reproducing device. At this point, the former standard-adaptable reproducing device interprets all the signals recorded on the disc as being based on the A codec, without checking the contents at the address 2 which is constantly set to the value 0 as shown in FIG. 18, and tries to reproduce the signals. Therefore, it cannot reproduce the signals or generates disordered and nonsense noise, thus causing a risk of confusing the user.

In view of such status of the art, the present Assignee has proposed, in the specification and drawings of the Japanese Publication of Unexamined Patent Application No.Hei 10-22935, a method for preventing confusion to the user of the device and generation of noise, by recording signals indicating that "a part of recorded signals cannot be reproduced by reproducing means adaptable only to this standard" on the basis of the former standard (A codec) in the case where recording is carried out in conformity to an additional standard (new standard), and by preventing reproduction of signals except for the signals recorded on the basis of the former standard (A codec) in the case where signals are reproduced by the former standard-adaptable reproducing device. In addition, in the specification and drawings of the Japanese Publication of Unexamined Patent Application No.Hei 10-22935, there is proposed a method for enabling easy recording with an inexpensive recording device adaptable to the new standard, by pre-recording a message signal based on the former standard (A codec) onto a recording medium and manipulating the contents of reproduction management information in the case where recording is carried out in conformity to the new standard so that the message signal is reproduced in the case where reproduction is carried out by the former standard-adaptable reproducing device. In the specification and drawing of the same publication, there is also proposed a method for notifying the user of the former standard-adaptable reproducing device of which tune is actually recorded in conformity to the former standard, by reproducing a message signal in accordance with a portion where recording is carried out in conformity to the new standard in the case where reproduction is carried out by the former standard-adaptable reproducing device. That is, in the specification and drawings of the Japanese Publication of Unexamined Patent Application No.Hei 10-22935, there is proposed a method for preventing erroneous reproduction of data which cannot be reproduced by the former standard-adaptable reproducing device, and transmitting the message notifying the user of the contents of the recording medium, thereby preventing the user of the former standard-adaptable reproducing device from being confused.

Figure 20:
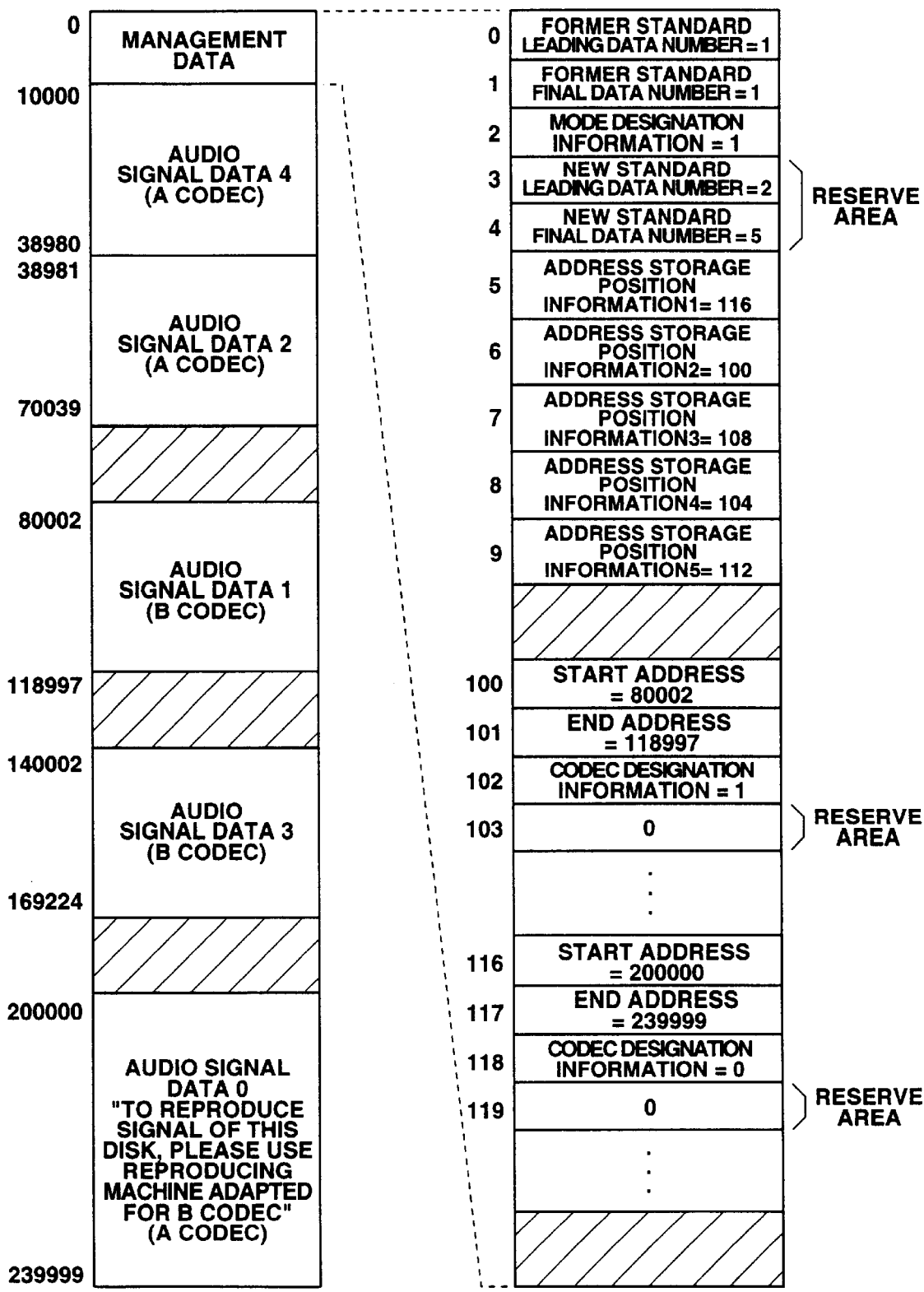
FIG. 20 illustrates a recording format embodying aspects of the present invention which prevents a former standard-adaptable reproducing device from reproducing B codec in the case where code strings of A codec and B codec are recorded.

FIG. 20 shows an example in which recording on the disc is carried out by the method described in the specification and drawings of the Japanese Publication of Unexamined Patent Application No.Hei 10-22935. In the example of FIG. 20, management data related to the new standard (B codec) is recorded separately from management data related to the former standard (A codec).

Specifically, in FIG. 20, the former standard-adaptable reproducing device first reads a former standard leading data number at an address 0 and a former standard final data number at an address 1 (which correspond to the leading data number and the final data number of FIG. 18). In the example of FIG. 20, it can be understood from these former standard leading data number the former standard final data number that only one unit of data of the data number 1 to 1 is recorded on the disc. Next, in order to learn where on the disc the one unit of data is recorded, the former standard-adaptable reproducing device checks the contents at an address 5 (that is, address storage position information) in accordance with the former standard, and learns the position in the management area where the address data is stored. Then, the former standard-adaptable reproducing device checks the contents from the address (116) indicated by the address storage position information of the address 5, thereby learning the position (address 200000) where the audio data signal of the data number 0 is recorded.

The former standard-adaptable reproducing device ignores codec designation information recorded at an address 118. However, in the method described in the specification and drawings of the Japanese Publication of Unexamined Patent Application No.Hei 10-22935, there is no problem since the audio signal of the data number 0 is actually coded in accordance with the A codec. The contents of the audio signal of the data number 0 is a message "To reproduce signals on this disc, please use a reproducing machine adaptable to B codec." By reproducing this signal, the confusion to the user of the former standard-adaptable reproducing device can be avoided.

On the other hand, in the case where the reproducing device adaptable to both the former standard and the new standard (that is, the new standard-adaptable reproducing device) reproduces this disc, first, the contents of mode designation information at an address 2 of FIG. 20 are checked in accordance with the new standard. By this operation, the new standard-adaptable reproducing device learns the possibility that signals are recorded on this disc on the basis of the new standard (B codec) with the value of the mode designation information of 1. Thus, the new standard-adaptable reproducing device ignores the former standard leading data number at the address 0 and the former standard final data number at the address 1, in accordance with the prescription in the case where the value of the mode designation information is 1. The new standard-adaptable reproducing device then interprets the data to be reproduced from this disc as being four units of data of the data numbers 2 to 5, from the contents of a new standard leading data number at an address 3 and a new standard final data number at an address 4, and then carries out reproduction. That is, in this case, the message (signal of the data number 0) for the former standard-adaptable reproducing device is not reproduced. However, this message can be reproduced also by the new standard-adaptable reproducing device, in order to give a notice to the user of this disc. In this case, the value of the new standard leading data number at the address 3 may be set to 1.

As is clear from the above description, by using the method described in the specification and drawings of the Japanese Publication of Unexamined Patent Application No.Hei 10-22935, it is possible not only to reproduce desired audio signal data recorded on the disc by the new standard-adaptable reproducing device, but also to reproduce only the message of notice concerning disc reproduction by the former standard-adaptable reproducing device, thus avoiding unnecessary confusion to the user.

In the foregoing method, however, the signal that can be reproduced by the former standard-adaptable reproducing device is the message signal, and is not the desired signal to be reproduced itself.

Thus, the present Assignee has proposed, in the specification and drawings of the Japanese Publication of Unexamined Patent Application No.Hei 9-42514, a technique to enable reproduction of a signal of the A codec even by using the former standard-adaptable reproducing device and enable reproduction of signals of both the A codec and the B codec by using the new standard-adaptable reproducing device in the case where the signals of the A codec and the B codec are recorded on the same disc. This technique is realized in a manner as later described.

Also, if the signals of the different standards such as the former standard (A codec) and the new standard (B codec) are simultaneously recorded on the same disc, recording areas to be allocated to the signals of the respective standards are diminished, and therefore it is considered to be difficult to maintain the quality of the recorded and reproduced signals (the sound quality, in the case of audio signals). However, the technique described in the specification and drawings of the Japanese Publication of Unexamined Patent Application No.Hei 9-42514 enables reduction in deterioration of sound quality.

To realize the foregoing, in the technique described in the specification and drawings of the Japanese Publication of Unexamined Patent Application No.Hei 9-42514, with respect to a code string prescribed to enable long time recording and reproduction with a small number of channels, a smaller number of bits than the total number of bits that can be allocated to each frame are allocated to the small number of channels, as in the case of the recording format shown in FIG. 13 or in the case where monaural signals are to be recorded in FIG. 12. In other words, with respect to the A codec, coding carried out with a smaller number of bits than the total number of bits that can be allocated to each frame so that a free recording area is provided in the frame, and in the free recording area in the frame thus obtained, signals of a channel which are not reproduced by the former standard-adaptable reproducing device, that is, signals of the B codec are recorded, thereby enabling multi-channel recording and reproduction (recording and reproduction of both the signals of the A codec and the signals of the B codec) in a long time mode. As the method for producing the free recording area, the band of the channel coded by the coding method in accordance with the A codec can be narrowed, other than adjustment of the number of allocated bits.

In the case where the signals of the A codec and the B codec are coded with a smaller number of bits than the number of bits that can be allocated to one frame, as described above, the number of bits allocated for coding of the A codec is reduced in comparison with the case where all the bits of one frame are allocated for coding of the A codec. Therefore, the sound quality in reproduction by the former standard-adaptable reproducing device is lowered. However, according to the technique described in the specification and drawings of the Japanese Publication of Unexamined Patent Application No.Hei 9-42514, since the method having higher coding efficiency than the A codec coding method, for example, using a conversion block of a long time, is employed as the B codec coding method, a relatively small number of bits suffice for the use in the B codec coding method and a relatively large number of bits can be secured for the use in the A codec coding method. Therefore, the deterioration of sound quality can be limited to a less significant degree.

That is, in the technique described in the specification and drawings of the Japanese Publication of Unexamined Patent Application No.Hei 9-42514, the signals of the channel which are not reproduced by the former standard-adaptable reproducing device, that is, the signals of the B codec are coded by the method more efficient than the signals of the channel which are reproduced by the former standard-adaptable reproducing device (signals of the A codec), and thus, deterioration of sound quality due to the reduction in the number of bits allocated to the signals which are reproduced by the former standard-adaptable reproducing device by realizing the above-described multi-channel can be restrained to the minimum level. As the actual method for improving the coding efficiency, there are various methods, as described above, such as increase in the time of the conversion block, employment of the variable length code, separation of the tone signal component and so on. All these methods are included in the foregoing technique. However, to simplify the explanation, an example employing increase in the time block length, the variable length code, and separation of the tone component will be described.

Figure 21:
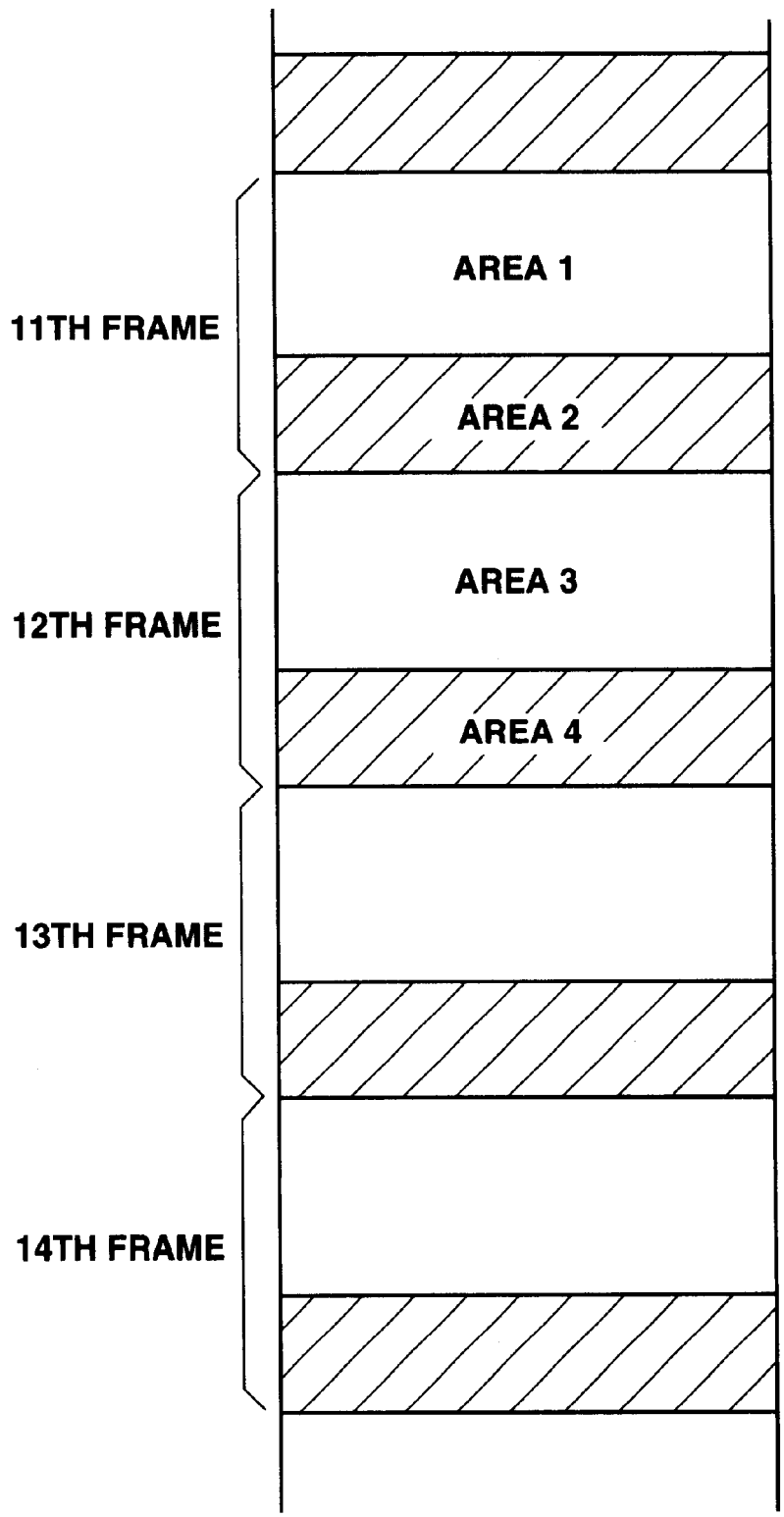
FIG. 21 illustrates the structure of a code string having signals of A codec and B codec arranged in a frame in accordance with the present invention.

FIG. 21 shows a specific example of a code string obtained by applying the technique described in the specification and drawings of the Japanese Publication of Unexamined Patent Application No.Hei 9-42514.

In the example of FIG. 21, each frame constituted by a predetermined number of bits is separated into two areas. In areas 1, 3 and the like of FIG. 21, a signal of a (L+R)/2 channel is coded by the A codec coding method and then recorded. In areas 2, 4 and the like indicated by slant lines in FIG. 21, a signal of a (L−R)/2 channel is coded by the B codec coding method and then recorded. The areas 2 and 4 correspond to the free recording area.

The A codec coding method is the coding method described with reference to FIG. 11. On the other hand, the B codec coding method can be exemplified by the coding method shown in FIG. 15 for coding a signal converted to a spectral signal component by a conversion block length twice that in the A codec. However, since the conversion block length in the B codec at this point is twice the conversion block length in the A codec, a code corresponding to the conversion block is recorded across two frames.

In the example of FIG. 21, since the A codec coding method employs a coding method with a fixed length, the number of bits used by a code string obtained by the A codec coding method (hereinafter referred to as an A codec code string) can be easily calculated. Thus, since the number of bits used by the A codec code string can be calculated, the leading position of a code string obtained by the B codec coding method (hereinafter referred to as a B codec code string) can also be found easily. As another method, the B codec code string may start at the last part of the frame. By this, even in the case where the variable length coding method is employed as the A codec coding method, the leading position of the B codec code string can be easily found. By thus enabling easy calculation of the leading position of the B codec code string, the reproducing device corresponding to both the A codec and the B codec (the new standard-adaptable reproducing device) can quickly process both code strings in parallel, and high-speed processing can be realized.

In the case where the A codec coding method includes information about the number of coding units as shown in FIG. 11 and where the channel coded by the A codec coding method is narrowed to secure the area (free recording area) for recording signals of another channel, quantization precision data and normalization coefficient data on the high frequency side can be omitted, which is convenient. In this case, too, the number of bits used for coding by the A codec coding method can be easily calculated.

In the example of FIG. 21, the signal of the (L+R)/2 channel is recorded as the A codec code string and the signal of the (L−R)/2 channel is recorded as the B codec code string, as described above. Therefore, by reproducing and decoding only the area where the A codec signal is recorded, monaural signal reproduction of the (L+R)/2 channel can be carried out. On the other hand, by reproducing and decoding both the area where the A codec signal is recorded and the area where the B codec signal is recorded and then calculating the sum, the signal of the L(left) channel can be generated, and by calculating the difference, the signal of the R(right) channel can be generated. Thus, stereo reproduction can be carried out.

With respect to the recording medium on which the code string as shown in FIG. 21 is recorded, the former standard-adaptable reproducing device ignores the area where coding is carried out by the B codec coding method, and therefore can reproduce monaural signals from the recording medium on which the code string is recorded. On the other hand, with respect to the recording medium on which the code string shown in FIG. 21 is recorded, the reproducing device having the decoding circuit for the A codec code and the decoding circuit for the B codec code (that is, the new standard-adaptable reproducing device) can reproduce stereo signals. Thus, if the coding method as shown in FIG. 21 is introduced as the standard for stereo reproduction by the new standard-adaptable reproducing device after the former standard-adaptable reproducing device became popular, the former standard-adaptable reproducing device can reproduce monaural signals. Since the decoding circuit for decoding the A codec code can be realized with hardware of a relatively small scale, the reproducing device having such decoding circuit can be manufactured at a relatively low cost.

Figure 22:
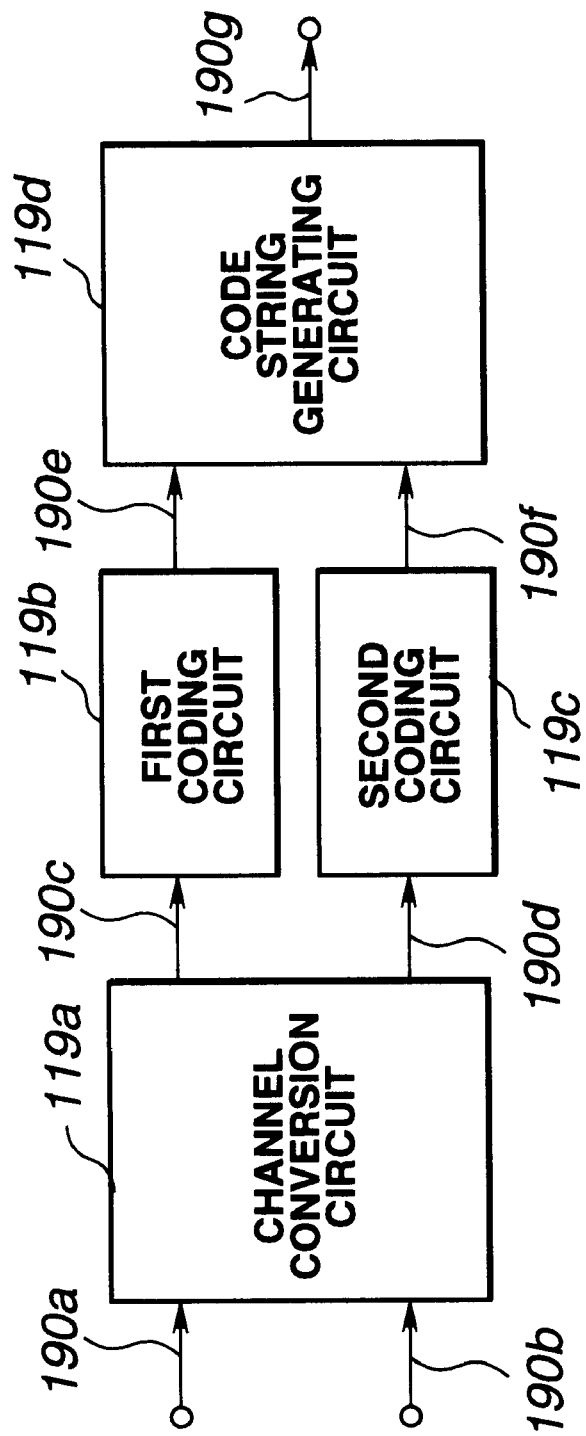
FIG. 22 is a block circuit diagram showing the specific structure of a coding device embodying aspects of the present invention for generating a code string having signals of A codec and B codec arranged in a frame.

FIG. 22 shows the specific structure of the coding device for generating the code string of FIG. 21.

In FIG. 22, an input signal 190a of the L channel and an input signal 190b of the R channel are converted to a signal 190c corresponding to (L+R)/2 and a signal 190d corresponding to (L−R)/2, respectively, by a channel conversion circuit 119a. The (L+R)/2 signal 190c is sent to a first coding circuit 119b, and the (L−R)/2 signal 190d is sent to a second coding circuit 119c.

The first coding circuit 119b corresponds to the signal component coding circuit 111b of FIG. 4 having the structure of FIG. 6, and the A codec coding method is applied. On the other hand, the second coding circuit 119c has a conversion block length double that of the first coding circuit 119b and corresponds to the signal component circuit 111b of FIG. 4 having the structure of FIG. 16. To this second coding circuit 119c, the B codec coding method is applied. An A codec code string 190e from the first coding circuit 119b and a B codec code string 190f from the second coding circuit 119c are both supplied to a code string generating circuit 119d.

The code string generating circuit 119d generates the code string shown in FIG. 21 from the code strings 190e and 190f, and outputs the resultant code string as an output code string signal 190g.

Figure 23:
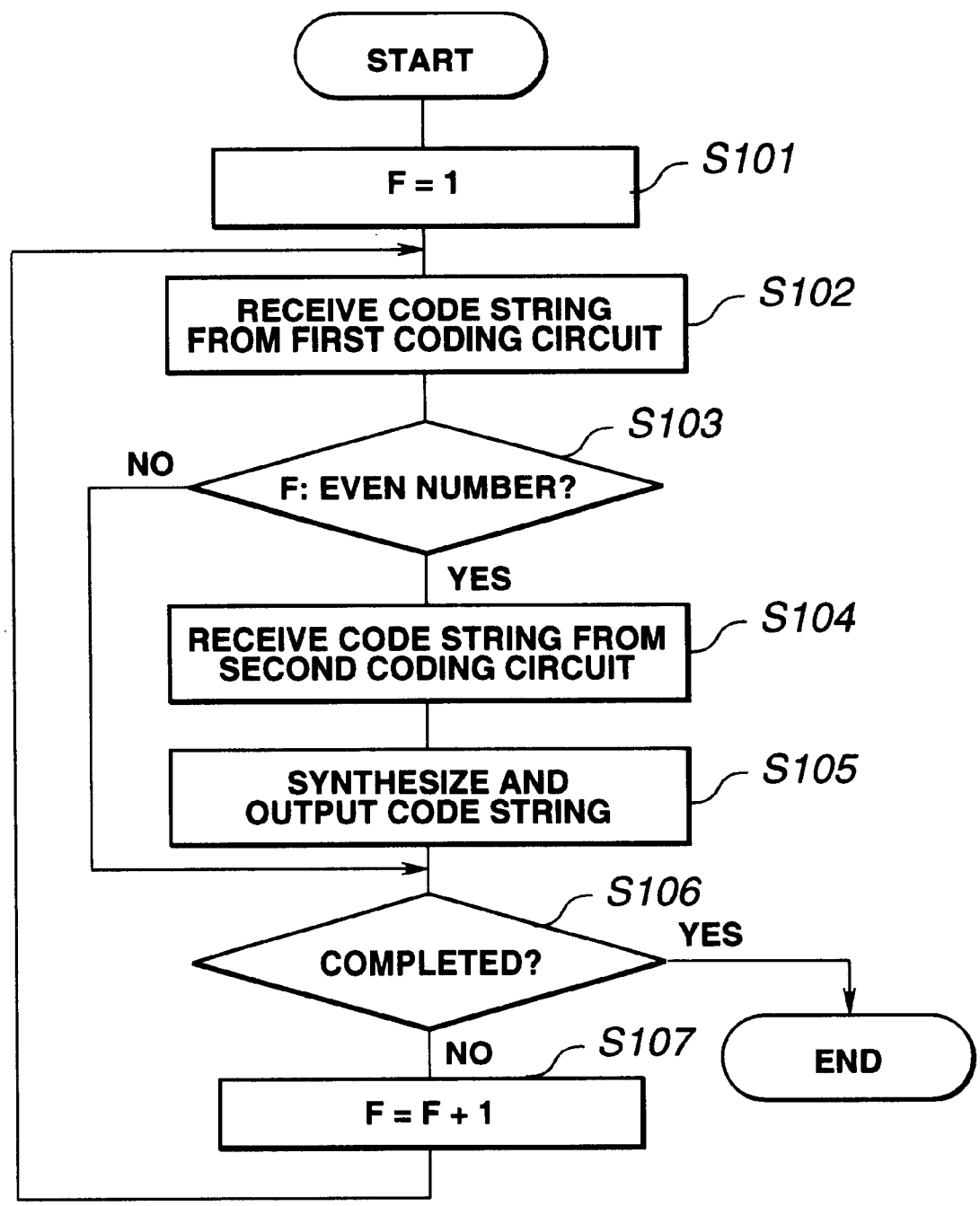
FIG. 23 is a flowchart showing an example of processing in the coding device of FIG. 22 for generating a code string having signals of A codec and B codec arranged in an frame.

FIG. 23 shows the flow of processing in generating the code string of FIG. 21 by the code string generating circuit 119d of FIG. 22.

In FIG. 23, at step S101, a frame number F is initialized to 1, and at step S102, the A codec code string 190e from the first coding circuit 119b is received. At step S103, it is determined whether the frame number F is an even number or not. If it is not an even number, the processing goes to step S106. If it is an even number, the processing goes to step S104.

At step S104, the B codec code string 190f from the second coding circuit 119c is received. At the subsequent step S105, the code string of FIG. 21 is synthesized from the code strings 190e and 190f.

At step S106, it is determined whether or not processing has been completed with respect to all the frames. If the processing has been completed, the processing of FIG. 23 ends. If not, increment of 1 is made on the frame number F at step S107 and the processing returns to step S102 to repeat the above-described processing.

In the processing of FIG. 23, though the frame number F starts with 1, a processing unit of the B codec coding method is two frames, which is double that of the A codec coding method, and therefore, generation of the code string is carried out for every two frames.

Figure 24:
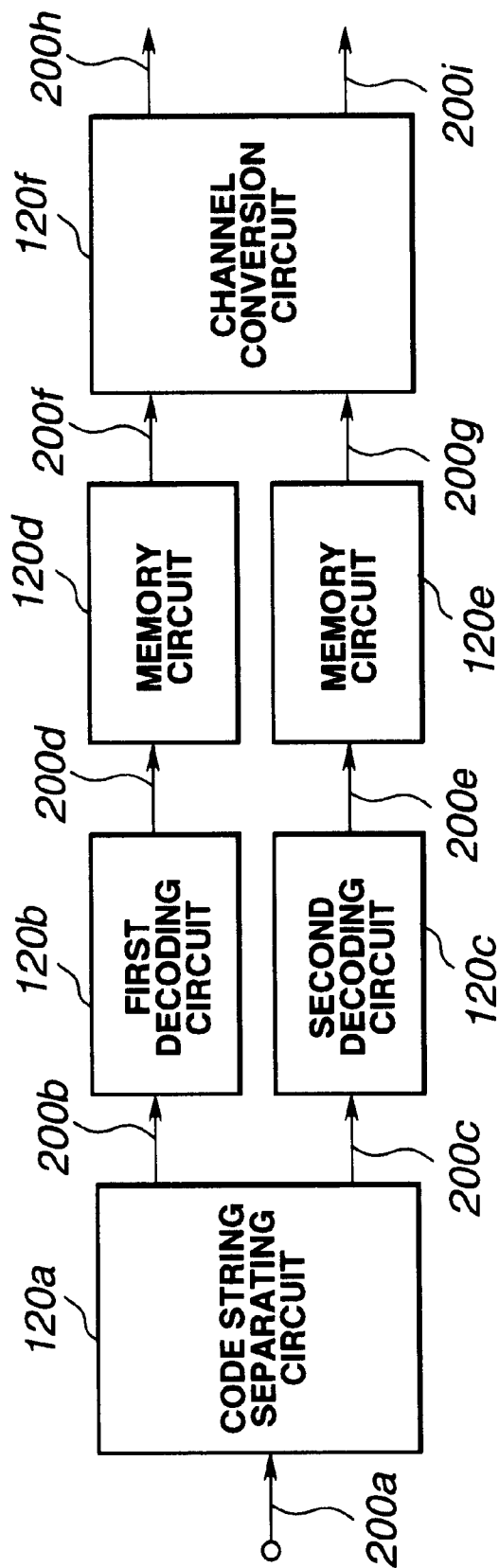
FIG. 24 is a block circuit diagram showing the specific structure of a signal component decoding device embodying aspects of the present invention for decoding a code string having signals of A codec and B codec arranged in a frame.

FIG. 24 shows the specific structure of the decoding device of the new standard-adaptable reproducing device for decoding the code string of FIG. 21 generated by using the coding method of the present invention.

In FIG. 24, an input code string 200 which is the code string of FIG. 21 is separated into an A codec code string 200b and a B codec code string 200c by a code string separating circuit 120a. The A codec code string 200b is sent to a first decoding circuit 120b, and the B codec code string 200c is sent to a second decoding circuit 120c.

The first decoding circuit 120b corresponds to the signal component decoding circuit 114b of FIG. 7 having the structure of FIG. 9 and is adapted for decoding the A codec code. On the other hand, the second decoding circuit 120c has a conversion block length double that of the second decoding circuit 120b and corresponds to the signal component decoding circuit 114b of FIG. 7 having the structure of FIG. 17. The second decoding circuit 120c is adapted for decoding the B codec code. A signal 200d obtained by decoding by the first decoding circuit 120b corresponds to the (L+R)/2 signal 190c, and a signal 200e obtained by decoding by the second decoding circuit 120c corresponds to the (L−R)/2 signal 190d.

Since the (L+R)/2 signal 200d and the (L−R)/2 signal 200e have different conversion block lengths, there is a difference in processing delay time thereof Therefore, the (L+R)/2 signal 200d from the first decoding circuit 120b is supplied to a memory circuit 120d, and the (L−R)/2 signal 200e from the second decoding circuit 120c is supplied to a memory circuit 120e, so that the difference in processing delay time is absorbed by these memory circuits 120d and 120e. A (L+R)/2 signal 200f and a (L−R)/2 signal 200g passed through these memory circuits 120d and 120e, respectively, are sent to a channel conversion circuit 120f.

This channel conversion circuit 120f generates an L channel signal 200h by adding the (L+R)/2 signal 200f and the (L−R)/2 signal 200g, and generates an R channel signal 200i by subtracting the (L−R)/2 signal 200g from the (L+R)/2 signal 200f. The channel conversion circuit 120f outputs these L channel and R channel signals.

Figure 25:
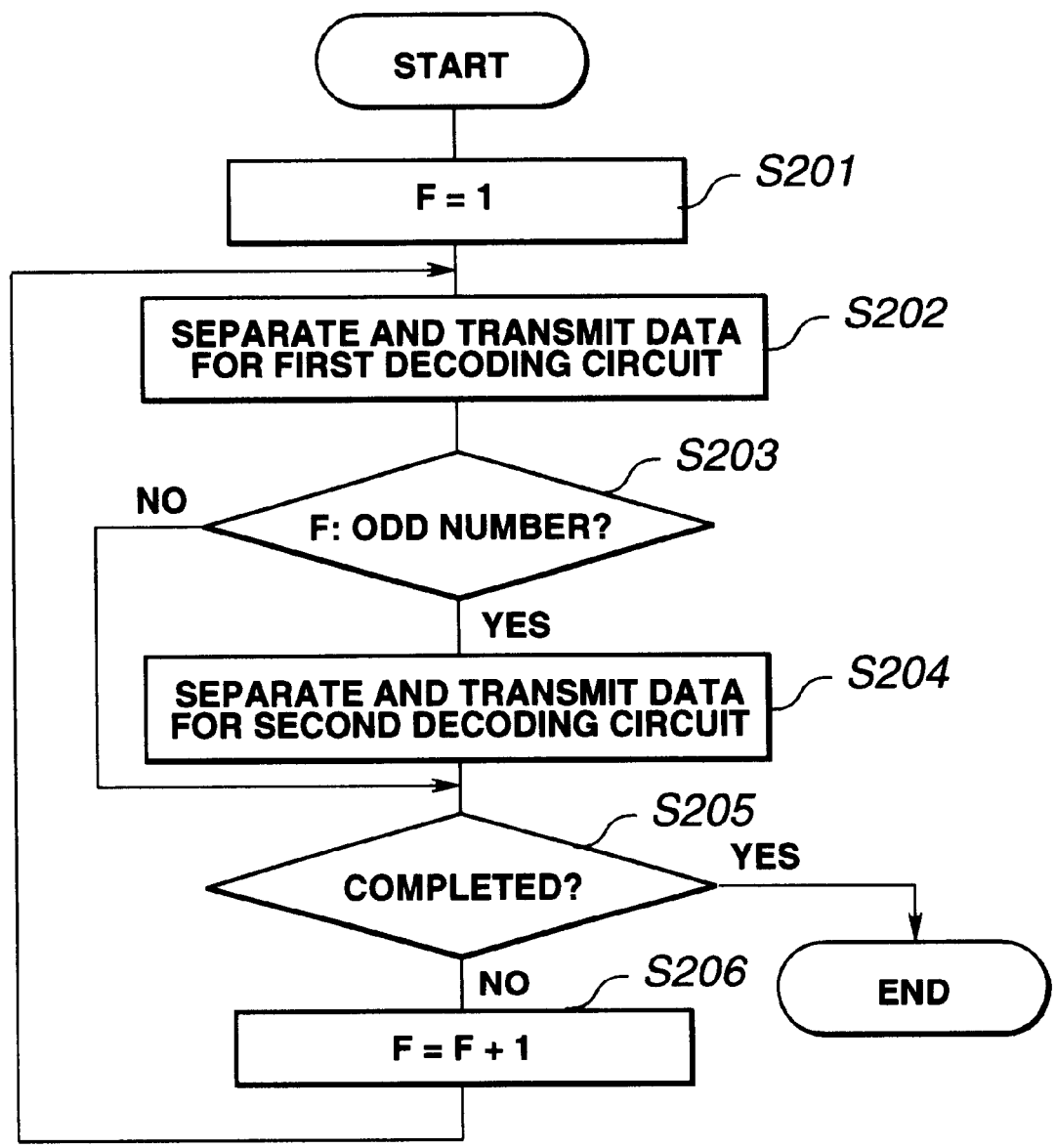
FIG. 25 is a flowchart showing an example of processing in the decoding device of FIG. 24 for decoding a code string having signals of A codec and B codec arranged in a frame.

FIG. 25 shows the flow of processing in separating the code string of FIG. 21 by the code string separating circuit 120a of FIG. 24.

In FIG. 25, at step S201, a frame number F is initialized to 1, and at step S202, separation and transmission of an A codec code string to be sent to the first decoding circuit 120b are carried out. At step S203, it is determined whether the frame number F is an odd number or not. If the frame number F is not an odd number, the processing goes to step S205. If it is an odd number, the processing goes to step S204.

At step S204, separation and transmission of a B codec code string to be sent to the second decoding circuit 120c are carried out.

At step S205, it is determined whether or not processing has been completed with respect to all the frames. If completed, the processing of FIG. 25 ends. If not, increment of 1 is made on the frame number F at step S206, and the processing returns to step S202 to repeat the foregoing processing.

In the processing of FIG. 25, though the frame number F starts with 1, a processing unit of the B codec coding method is two frames, which is double that of the A codec coding method, and therefore, separation of the code string is carried out for every two frames.

In the above-described example, only the signal of the additional channel (B codec signal) is recorded in the free recording area of each frame. However, as described in the conventional technique, the quantization noise generated by coding might cause a problem, depending on the type of stereo signals.

A method for solving this problem according to the embodiment of the present invention will now be described.

Figure 26:
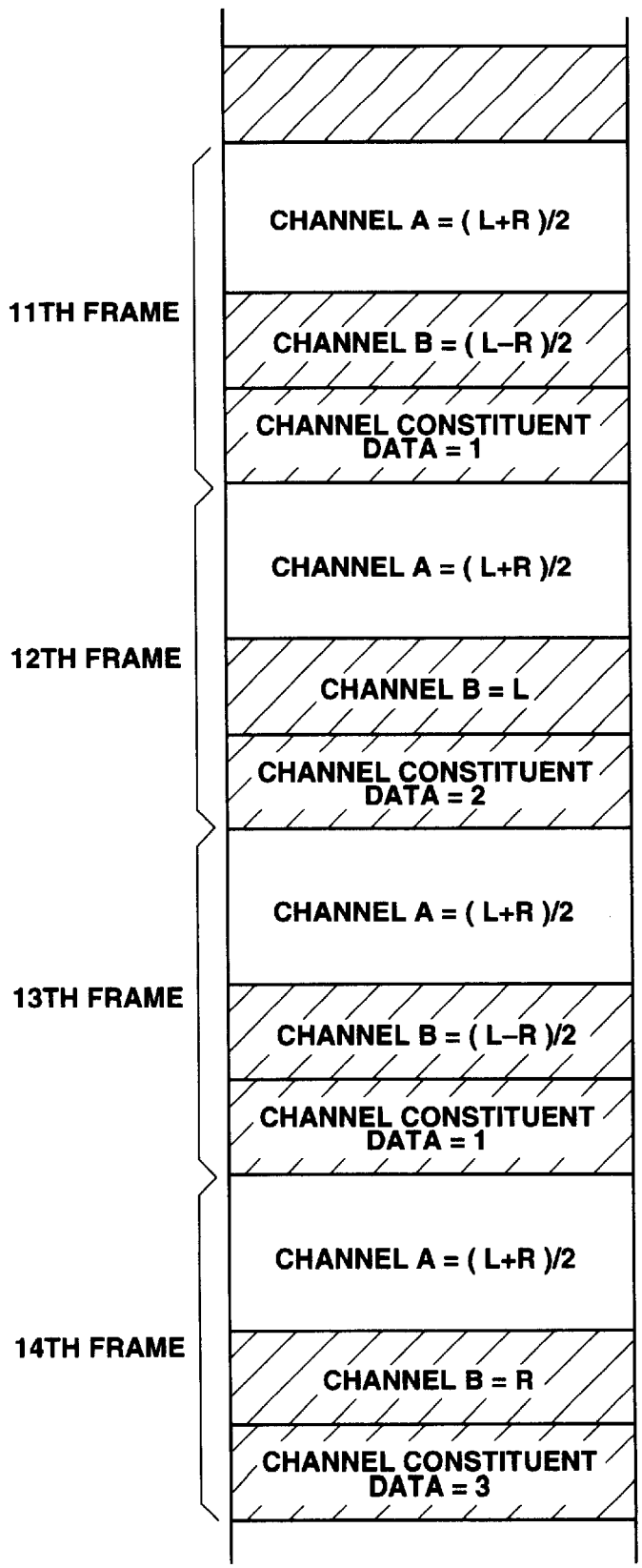
FIG. 26 illustrates the structure of a code string of an embodiment of the present invention in which channel constituent data and signals of channel A and channel B are arranged in a frame.

FIG. 26 shows a specific example of the code string of the embodiment to which a method consistent with the present invention is applied. In the example of FIG. 26, with the new standard, signals of two channels obtained by combining the (L+R)/2 channel and an additional channel can be recorded by recording channel constituent data and the signal of the additional channel into the free recording area, while with the former standard, only signals (acoustic signals) of one channel of (L+R)/2 can be recorded.

The channel corresponding to (L+R)/2 is expressed as a channel A, and the channel corresponding to the additional channel is expressed as a channel B. The signals of two channels area actually recorded in the case where a space for recording the channel constituent data is secured after the signal of the channel A and where the channel constituent data is secured after the signal of channel A and where the channel constituent data has a value except for 0. The signal of the channel B is a signal of any of (L−R)/2, L, and R channels, and the value of the channel constituent data indicates which of these channels is recorded. In this example, the signal of the (L−R)/2 channel is recorded if the value of the channel constituent data is 1. The signal of the L channel is recorded if the value of the channel constituent data is 2, and the signal of the R channel is recorded if the value of the channel constituent data is 3. By setting the value of the channel constituent data to 0, it is possible to let the user hear only a acoustic signal of channel A.

In the case where the value of the channel constituent data is set to 0, it is possible to record only the channel A without using all the bits allocated to the frame.

Figure 27:
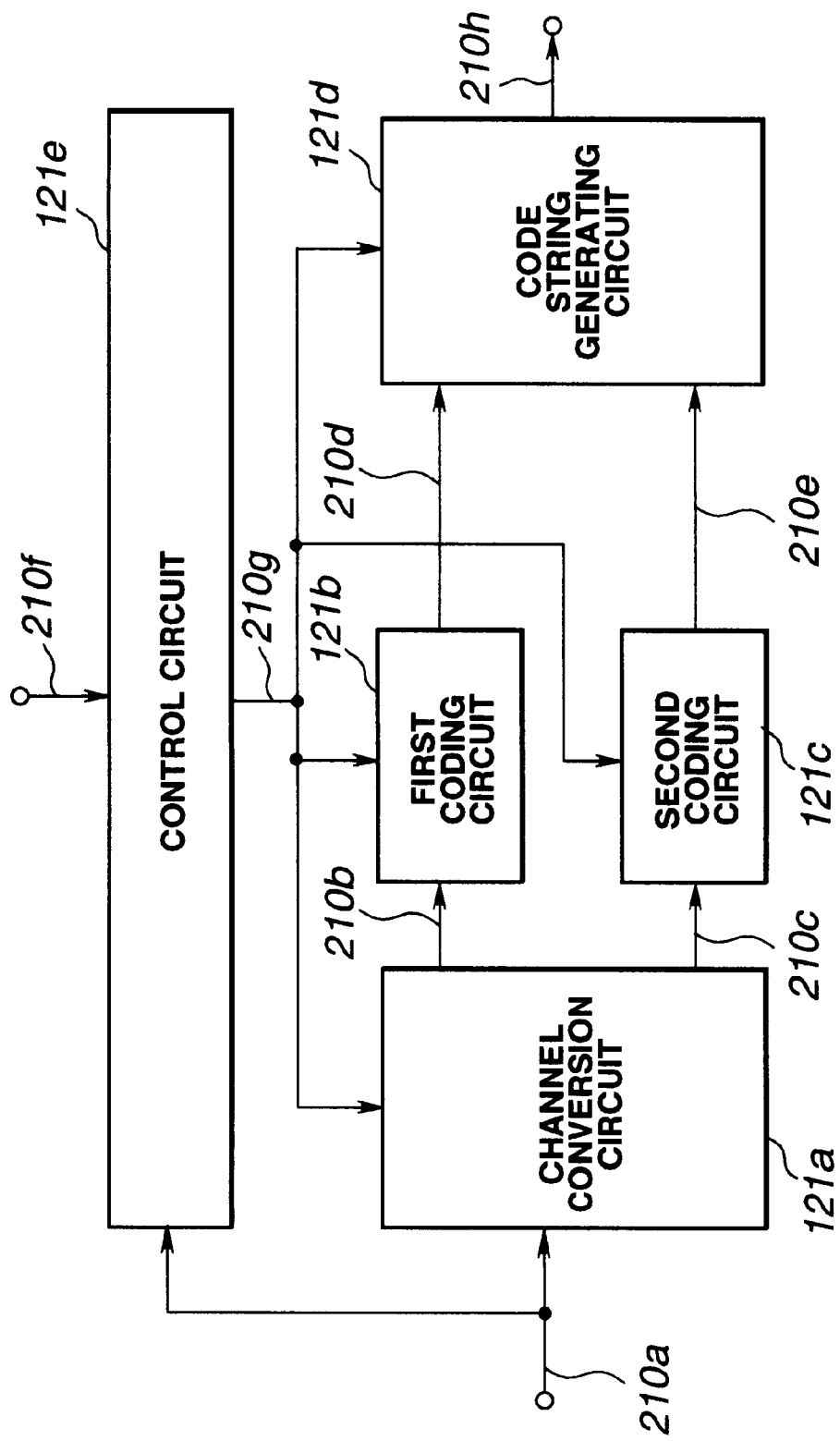
FIG. 27 is a block circuit diagram showing the specific structure of a coding device for generating code string according to an embodiment of the present invention in which channel constituent data and signals of channel A and channel B are arranged in a frame.

FIG. 27 shows an example of the structure of the coding device for generating the code string shown in FIG. 26 according to the embodiment of the present invention.

In FIG. 27, an input signal 210a is a signal of the L channel and R channel. This input signal 210a is converted to a signal 210b corresponding to the channel A, that is, (L+R)/2, and a signal 210c corresponding to the channel B by a channel conversion circuit 121a. The channel A signal 210b is sent to a first coding circuit 121b, and the channel B signal 210c is sent to a second coding circuit 121c.

The first coding circuit 121b encodes the channel A signal 210b, and the second coding circuit 121c encodes the channel B signal 210c. A channel A code string 210d from the first coding circuit 121b and a channel B code string 210e from the second coding circuit 121c are both supplied to a code string generating circuit 121d.

The code string generating circuit 121d generates the code string shown in FIG. 26 from the code strings 210d and 210e, and outputs the resultant code string as an output code string signal 210h.

Figure 28:
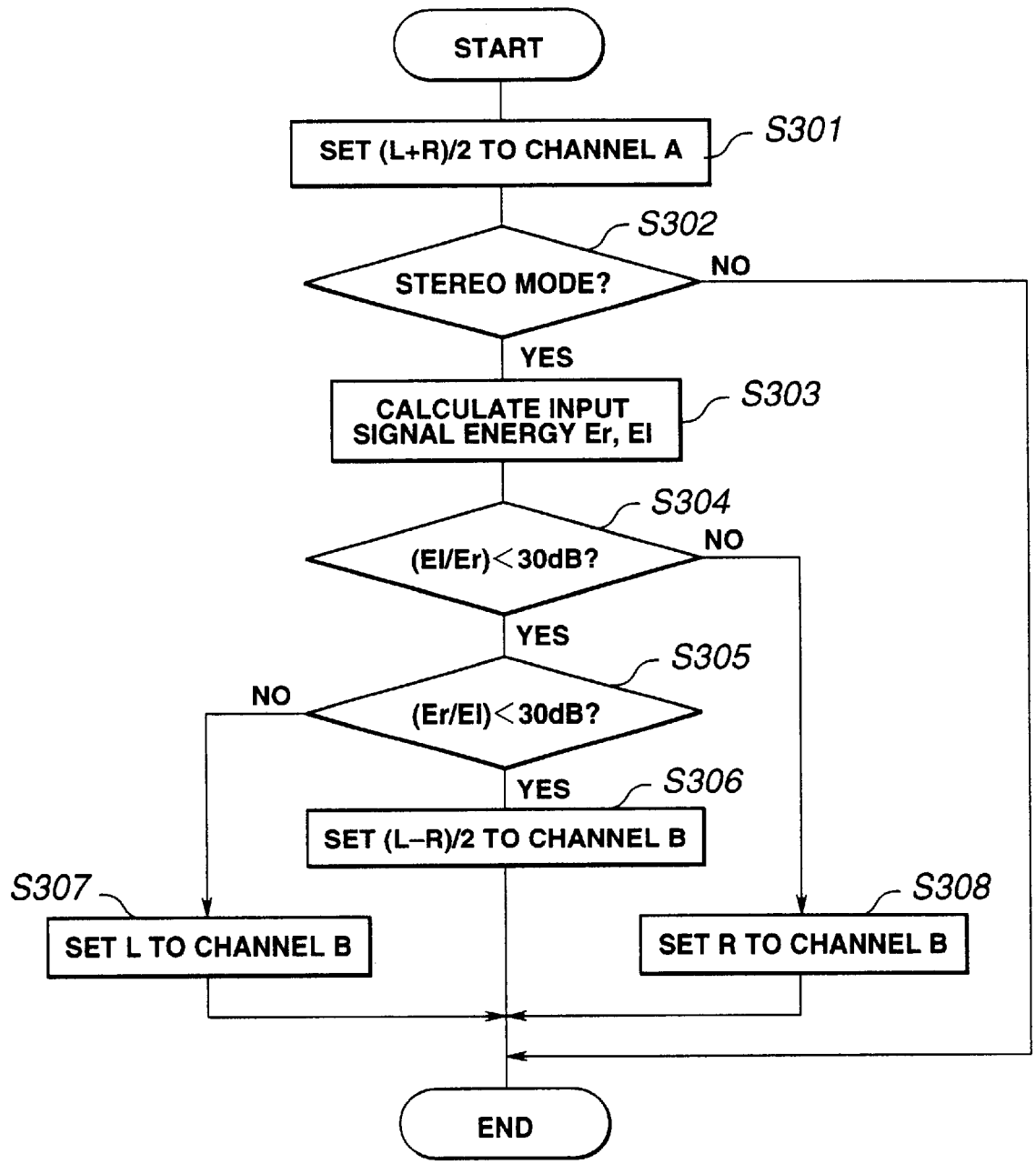
FIG. 28 is a flowchart showing the flow of processing in a control circuit of the coding device of FIG. 27 for generating a code string according to the embodiment of the present invention.
Figure 29:
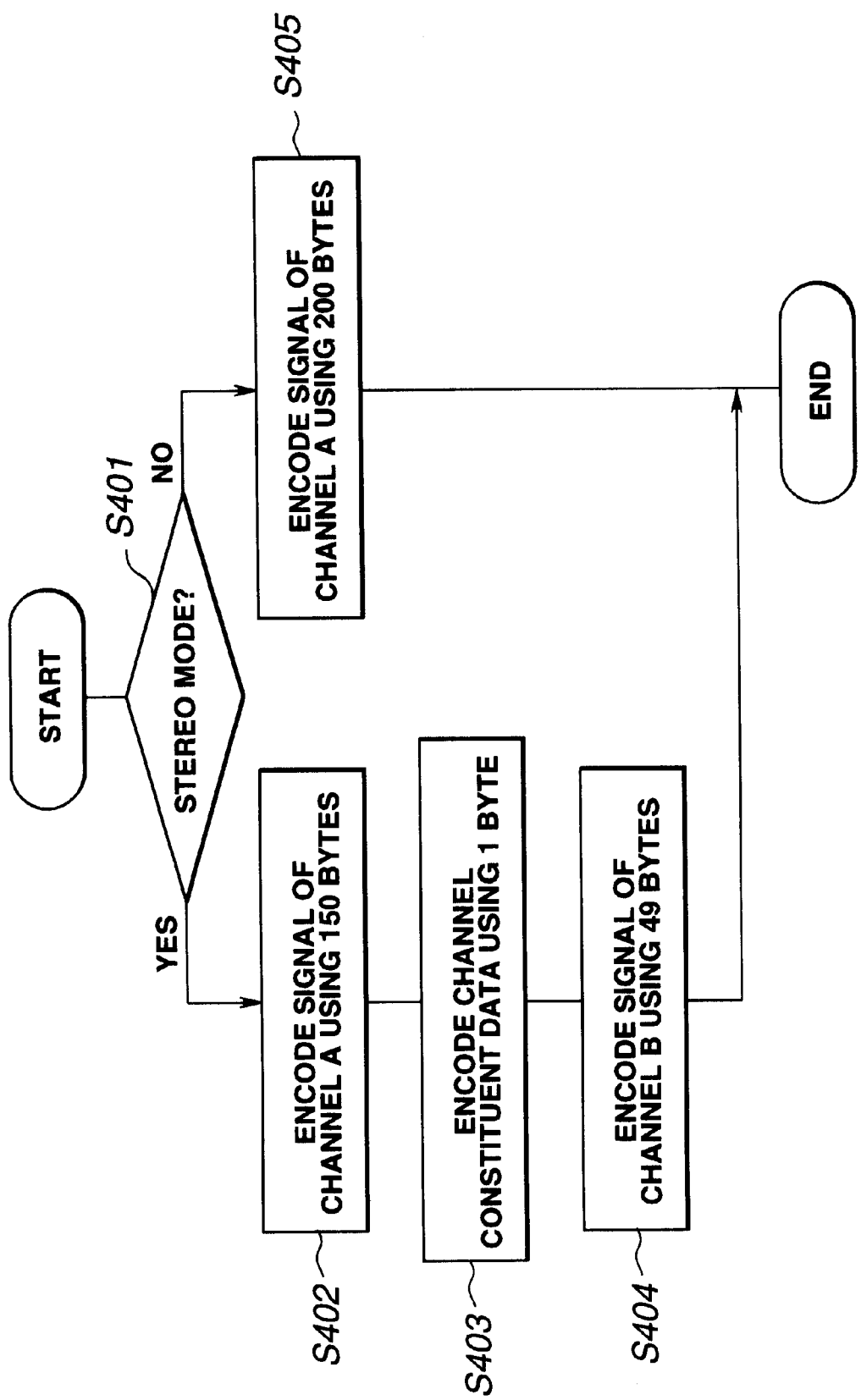
FIG. 29 is a flowchart showing the flow of processing in the coding device of FIG. 27 according to the embodiment of the present invention for generating a code string in which channel constituent data and signals of channel A and channel B are arranged in a frame.

In the structure of FIG. 27, a control circuit 121e is provided. This control circuit 121e generates a control signal 210g for controlling the constituent elements from the channel conversion circuit 121a to the code string generating circuit 121d in accordance with an input signal 210f for designating a coding mode and the input signal 210a, so as to generate the code string of FIG. 26 in a manner as shown in the flowcharts of FIGS. 28 and 29, The control circuit 121e then sends the control signal to each constituent element. The control signal 210g includes information indicating which of a stereo mode and a monaural mode is to be used for coding and information indicating which mode is used for coding the channel B, that is, information indicating which of the (L−R)/2, R, and L channels of signals are to be coded.

FIG. 28 shows the flow of processing of the control circuit 121e in the structure of FIG. 27.

The processing in this case is carried out on the frame basis. First, at step S301, (L+R)/2 is set to the channel A, and at step S302, it is discriminated whether the stereo mode is set or not, from the input signal 210f of FIG. 27. If the stereo mode is not set, the processing ends. If the stereo mode is set, the processing goes to step S303. At step S303, the signal energy of each frame of the input signal 210a is found with respect to each channel. The energy of the L channel is referred to as El, and the energy of the R channel is referred to as Er. At step S304, the energies El and Er are compared. If the ratio of El to Er (that is, El/Er) is smaller than 30 dB, the processing goes to step S305. On the contrary, if the ratio is not smaller than 30 db, that is, if the energy of the R channel is sufficiently small with respect to the energy of the L channel, the R channel is set to the channel B at step S308. At step S305, the energies El and Er are similarly compared. If the ratio of Er to El (that is, Er/El) is smaller than 30 dB, (L−R)/2 is set to the channel B at step S306. On the contrary, if the ratio is greater, than 30 dB, that is, if the energy of the L channel is sufficiently small with respect to the energy of the R channel, the L channel is set to the channel B at step S307. The channel information set here is outputted as the control signal 210g of FIG. 27. In this example, channel selection for the channel B is carried out by comparing the energy ratio of the R channel with the value of 30 dB. However, the amplitude ration of the signal may be compared instead of the energy, and the value of 30 dB may be changed in accordance with the level of quantization noise, for example, to a value of 10 dB.

FIG. 29 shows the flow of processing in generating the code string as shown in FIG. 26 on the basis of the control signal 210g in the structure of FIG. 27. In the example of FIG. 29, for example, 200 bytes are allocated to each frame.

In FIG. 29, at step S401, it is determined whether or not recording and reproduction should be carried out in the stereo mode as described above. When a mode designation signal 210f of FIG. 27 indicates the stereo mode, the processing of step S402 and the subsequent steps is carried out. When not the stereo mode but the monaural mode is selected, the processing shifts to step S405.

In FIG. 29, at step S402 in the case where coding in the stereo mode is designated at step S401, the signal of the channel A, that is, (L+R)/2, is coded by using 150 bytes. At the subsequent step S403, the channel constituent data is generated and coded by using one byte. After that, at step S404, the channel B signal is coded by using 49 bytes.

With respect to the channel constituent data, 1 is coded if the channel B is set to (L−R)/2, and 2 is coded if the channel B is set to the L channel, while 3 is coded if the channel B is set to the R channel.

On the other hand, at step S405 in the case where the monaural mode is selected at step S401, the signal of the channel A, that is, (L+R)/2, is coded by using 200 bytes.

Figure 30:
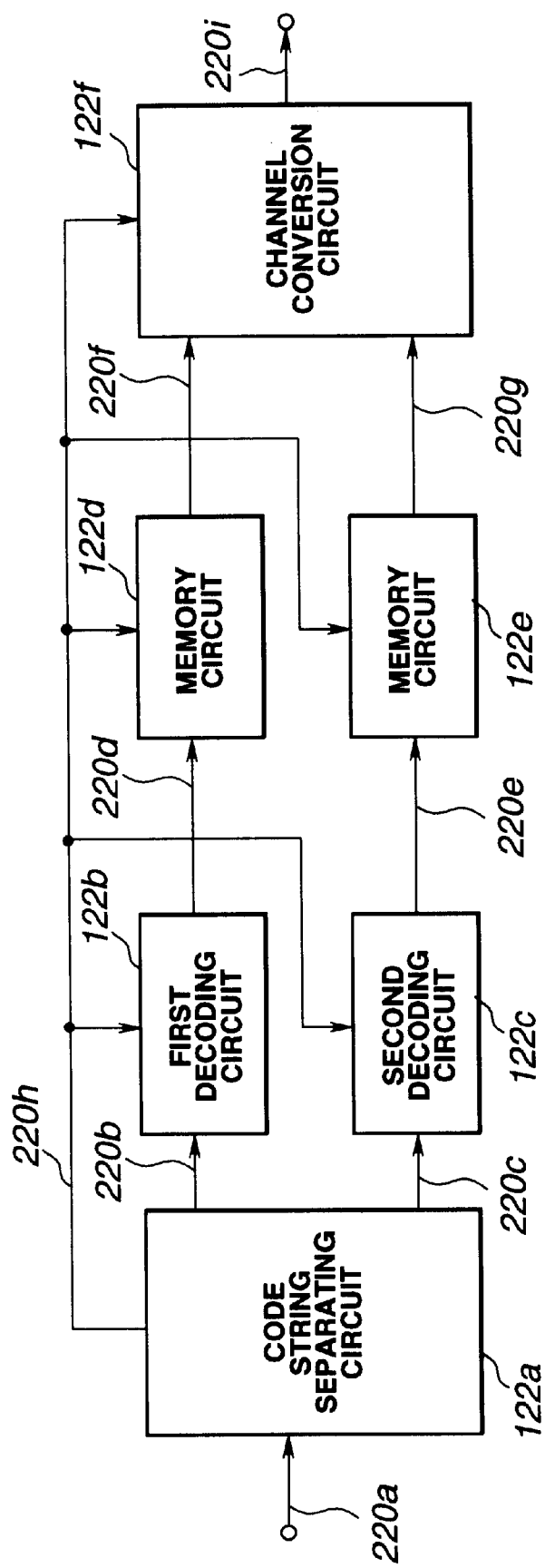
FIG. 30 is a block circuit diagram showing the specific structure of a decoding device according to an embodiment of the present invention for decoding a code string in which channel constituent data and signals of channel A and channel B are arranged in a frame.

FIG. 30 shows a specific example of the decoding device of the present embodiment for decoding the code string as shown in FIG. 26.

In FIG. 30, an input code string 220a, which is the code string of FIG. 26, is separated into a channel A code string 220b and a channel B code string 220c by a code string separating circuit 122a. The channel A code string 220b corresponds to the channel A code string 210d, and the channel B code string 220c corresponds to the channel A code string 210e. The channel A code string 220b is sent to a first decoding circuit 122b, and the channel B code string 220c is sent to a second decoding circuit 122c. The first decoding circuit 122b decodes the channel A code string 220b, and the second decoding circuit 122c decodes the channel B code string 220c.

Since a channel A signal 220d obtained by decoding by the first decoding circuit 122b and a channel B signal 220e obtained by decoding by the second decoding circuit 122c have different byte lengths, there is a difference in processing delay time thereof. Therefore, the channel A signal 220d from the first decoding circuit 122b is supplied to a memory circuit 122d and the channel B signal 220e from the second decoding circuit 122c is sent to a memory circuit 122e, so that the difference in processing delay time is absorbed by the memory circuits 122d and 122e. A channel A signal 220f and a channel B signal 220g passed through the memory circuits 122d and 122e, respectively, are sent to a channel conversion circuit 122f.

The channel conversion circuit 122f generates acoustic signals from the channel A signal, that is, (L+R)/2 signal 220f and the channel B signal 220g, and outputs each of these acoustic signals.

In the structure of FIG. 30, the channel constituent data is also separated from the input code string 220a by the code string separating circuit 122a. In the stereo mode, the code string separating circuit 122a separates the channel constituent data, and generates a control signal 220h for carrying out the above-described decoding processing in the structure constituted by the code string separating circuit 122a to the channel conversion circuit 122f, thus sending this control signal to each constituent element. On the other hand, in the monaural mode, only the channel A code string 220b is outputted from the code string separating circuit 122a, and monaural signals are reproduced in the structure constituted by the first decoding circuit 122b and the subsequent elements.

Figure 31:
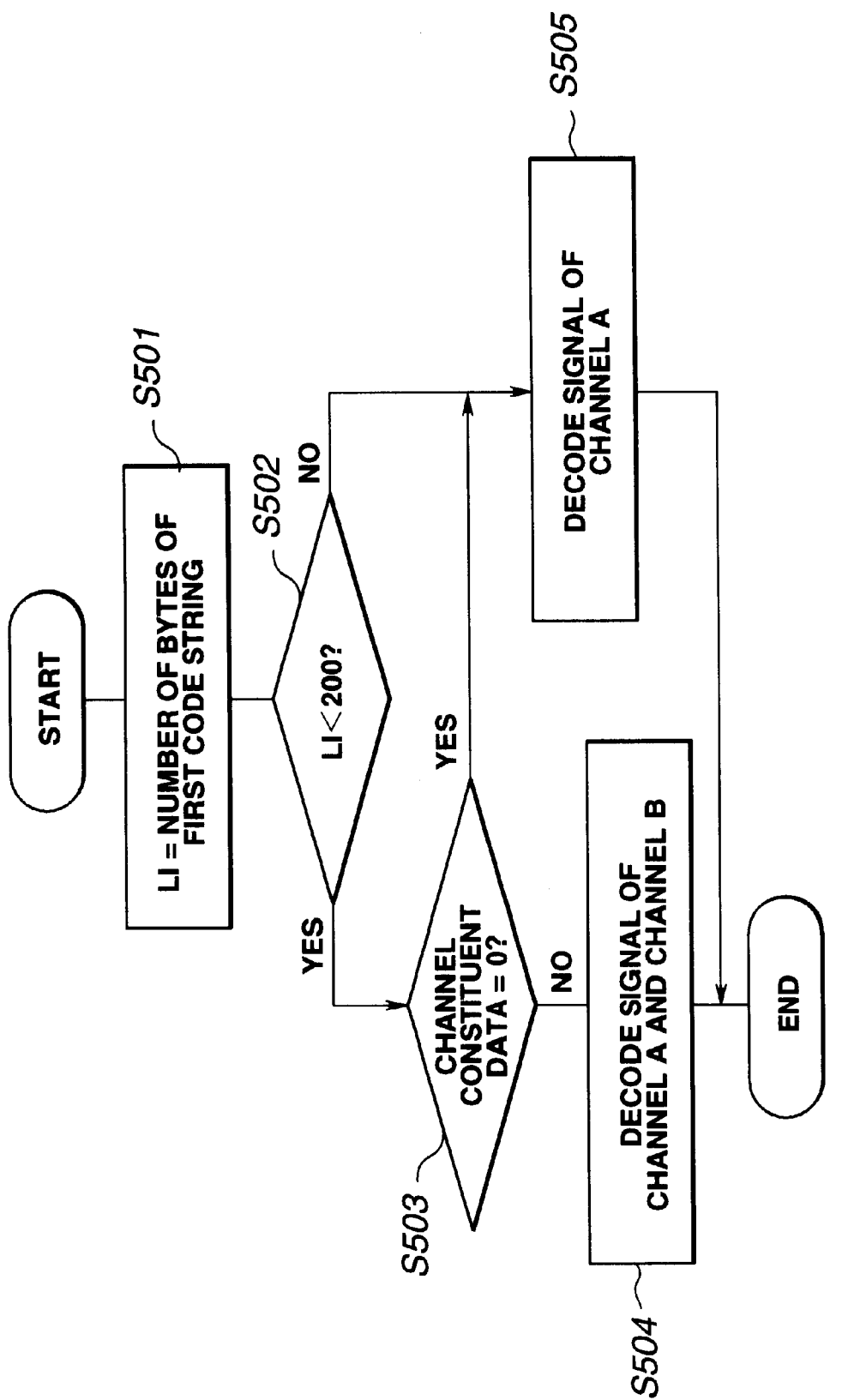
FIG. 31 is a flowchart showing the flow of processing in the decoding device of FIG. 30 for decoding a code string according to the embodiment of the present invention.

FIG. 31 shows the flow of processing in the structure of FIG. 30 for decoding the code string shown in FIG. 26.

In FIG. 31, at step S501, the number of bytes L1 of the first code string of the input code string 220a, that is, the channel A code string 220b, is found by calculation. At step S502, it is determined whether or not the number of bytes L1 is smaller than 200. If L1 is smaller than 200, the processing goes to step S503 and the subsequent steps. If L1 is not smaller than 200 (L1=200), the processing goes to step S505. At step S502, it is discriminated which of the monaural mode and the stereo mode is set. That is, at step S502, whether recording is carried out in conformity to the former standard or the new standard is discriminated on the basis of the number of bytes of the code string. By thus carrying out discrimination based on the number of bytes of the code string, it becomes possible to change the mode for each frame or every several frames.

The discrimination of the monaural mode and the stereo mode can also be embedded as mode designation information in the management data, as shown in FIG. 19.

At step S503, it is determined whether the value of the channel constituent data is 0 or not. If the value is 0, the processing goes to step S505. If the value is not 0, the processing goes to step S504.

At step S504, the control signal 220h for decoding the channel A signal and the channel B signal is generated and sent to each constituent element. Thus, the channel A code string 220b is decoded by the first decoding circuit 122b and the channel B code string 220c is decoded by the second decoding circuit 122c, as described above. At step S505, since the monaural signal is set, the control signal 220h for decoding the channel A signal is generated and sent to each constituent element, and only the A channel code string 220b is decoded by the first decoding circuit 122b, as described above.

Figure 32:
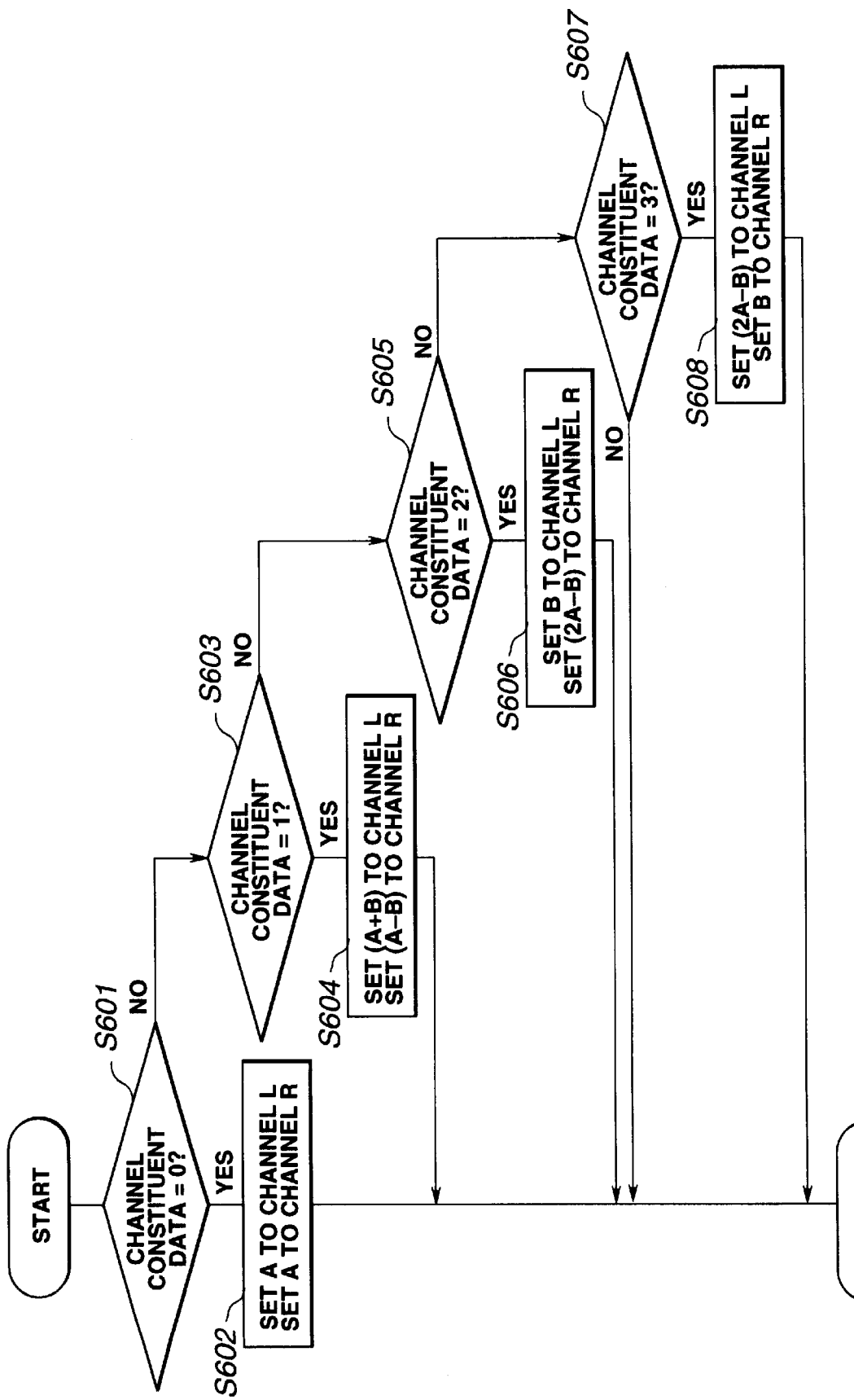
FIG. 32 is a flowchart showing the flow of processing for determining a decoding mode in the decoding device of FIG. 30 for decoding a code string according to the embodiment of the present invention.

FIG. 32 shows exemplary processing of a method for determining channel setting in the case where the code string separating circuit 122a of FIG. 30 is in the stereo mode for decoding.

In FIG. 32, first, at step S601, it is determined whether the value of the channel constituent data is 0 or not. If the value of the channel constituent data is 0, the processing goes to step S602. At step S602, the control signal 220h of FIG. 30 is generated on the assumption that the channel A is outputted as both the L channel and the R channel.

On the other hand, if it is determined at step S601 that the value of the channel constituent data is not 0, the processing goes to step S603. At step S603, it is determined whether the value of the channel constituent data is 1 or not. If it is determined that the value of the channel constituent data is 1, the processing goes to step S604. At step S604, the control signal 220h of FIG. 30 is generated on the assumption that a channel (A+B) is outputted as the L channel while a channel (A−B) is outputted as the R channel.

If it is determined at step S603 that the value of the channel constituent data is not 1, the processing goes to step S605. At step S605, it is determined whether the value of the channel constituent data is 2 or not. If it is determined at step S605 that the value of the channel constituent data is 2, the processing goes to step S606. At step S606, the control signal 220h of FIG. 30 is generated on the assumption that the channel B is outputted as the L channel while a channel (2A−B) is outputted as the R channel.

If it is determined at step S605 that the value of the channel constituent data is not 2, the processing goes to step S607. At step S607, it is determined whether the value of the constituent data is 3 or not. If it is determined at step S607 that the value of the channel constituent data is 3, the processing goes to step S608. At step S608, the control signal 220h of FIG. 30 is generated on the assumption that a channel (2A−B) is outputted as the L channel while the channel B is outputted as the R channel. If it is determined at step S607 that the value of the channel constituent data is not 3, the processing ends.

As the control signal 220h generated as described above is sent to the channel conversion circuit 122f, when the stereo mode is set, the L and R channel signals are outputted from the channel conversion circuit 122f, and when the monaural mode is set, monaural signals are outputted. That is, in the case where the value of the channel constituent data is 0, monaural signals are obtained by outputting the channel A signal in both the L channel and the R channel as described above. In the case where the value of the channel constituent data is 1, the L channel signal is obtained in (A+B) and the R channel signal is obtained in (A−B) as described above. In addition, in the case where the value of the channel constituent data is 2, the L channel signal is obtained from the channel B and the R channel signal is obtained in (2A−B). Moreover, in the case where the value of the channel constituent data is 3, the L channel signal is obtained in (2A−B) and the R channel signal is obtained from the channel B.

Figure 33A:
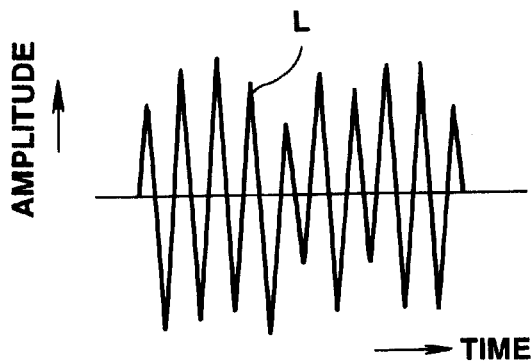
FIGS. 33A to 33H illustrate the states of quantization noise generated in the case where a stereo signal such that the signal level of the right channel (R) is much lower than the signal level of the left channel (L) is coded, decoded, and reproduced according to the embodiment of the present invention.
Figure 33B:
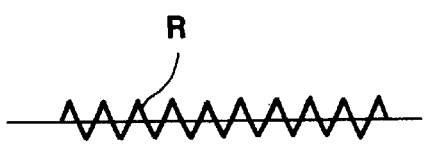

An example in which stereo signals as shown in FIGS. 33A and 33B, similar to FIGS. 1A, 1B, 2A and 2B, are processed by using the method of the embodiment of the present invention will now be described.

Figure 33C:
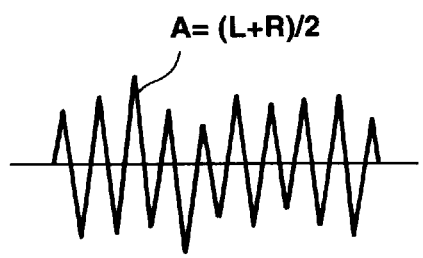
Figure 33D:
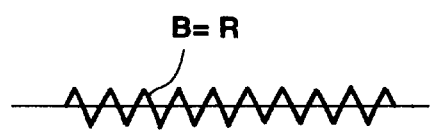

FIGS. 33A and 33B show time base waveforms of a left channel component (L) of a stereo signal and a right channel component (R) of the stereo signal, respectively. FIGS. 33C and 33D show time base waveforms of a signal such that the L and R channel components are expressed as (L+R)/2=channel A and a signal such that channel conversion to R=channel B is carried out.

Figure 33E:
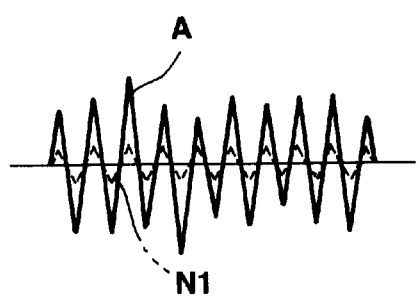
Figure 33F:
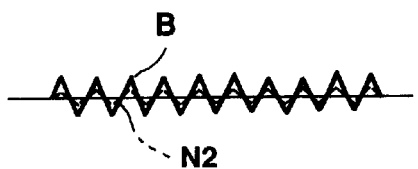

FIGS. 33E and 33F show the states of quantization noise generated in coding the signal of (L+R)/2=channel A and the signal of R=channel B by the above-described high efficiency coding method of the embodiment of the present invention and then decoding these signals, respectively. In FIGS. 33E and 33F, N1 and N2 show time base waveforms of quantization noise components generated in coding the signal of (L+R)/2=channel A and the signal of R=channel B, respectively. The signal after coding and decoding the signal of (L+R)/2=channel A can be expressed as A+N1, and the signal after coding and decoding the signal of R=channel B can be expressed as B+N2.

Figure 33G:
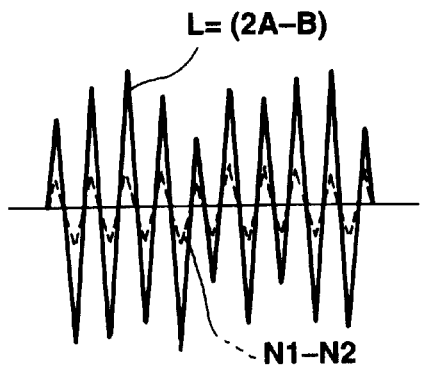
Figure 33H:
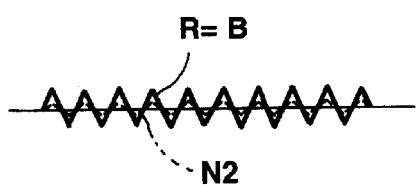

FIGS. 33G and 33H shows the states where the L and R channels of the stereo signal are separated from the signal waveforms of (A+N1) and (B+N2). The L channel is generated from (2A−B), and the R channel is the channel B itself.

Specifically, when the stereo signals as shown in FIGS. 33A to 33H are processed by the above-described conventional technique, the quantization noise generated by coding becomes a problem, as described above. However, in the present embodiment, by coding the R channel independently as the channel B on the assumption of A=(L+R)/2 and R=B as shown in FIGS. 33C and 33D, the R channel is not affected by quantization noise generated in the other channel. Therefore, the signal of the R channel can be reproduced with good sound quality. The L channel is not affected by quantization noise generated in the other channel since the signal level of the R channel is small, and therefore there is no problem. In general, in coding by such method, information used for the channel B is often reduced. However, in the method of the embodiment of the present invention, channel conversion is carried out so as to select a channel of a small signal level as the channel B. Therefore, even when the channel B is coded with less information, little deterioration of sound quality is generated.

Thus, a coding method and a decoding method which enable reproduction of a small number of channels in the former standard-adaptable reproducing device and reproduction of a greater number of channels in the new standard-adaptable reproducing device and which restrain the deterioration of sound quality to the minimum level by carrying out optimum channel conversion, and a recording medium on which signals are thus coded, are all included in the method of the present invention.

In the above description, the method of splitting a whole signal into two bands, then carrying out spectrum conversion, and then normalizing and quantizing the spectrum coefficient to code the spectrum coefficient with a fixed length, is employed as the first coding method, and the method of splitting a whole signal into two bands, then separating the spectrum coefficient into a tone component and other components, and then normalizing and quantizing each component to code each component with a variable length, is employed as the second coding method. However, as the coding methods, various other methods can be considered. For example, a method of normalizing and quantizing a time series signal which has been band-split and then thinned in accordance with the bandwidth, to code the resultant signal with a fixed length, may be employed as the first coding method, while a method of spectrum-converting time series signals of all bands and normalizing and quantizing the spectrum coefficient to carry out coding, may be employed as the second coding method. As the second coding method, it is desired to employ a method of the best coding efficiency, thereby reducing the deterioration in sound quality in the case where the signal is reproduced by the former standard-adaptable reproducing device.

In addition, though audio signals are processed in the above-described example, the method of the present invention can be applied to the case where signals reproduced by the former standard-adaptable reproducing device are image signals. Specifically, in the case where a luminance signal is coded as a code string of the former standard, a color difference signal and a hue signal can be added to the code string by using the method of the present invention. The channels in the present invention include the luminance signal, color difference signal and hue signal in the case of an image.

In the above description, a coded bit stream is recorded onto the recording medium. However, the method of the present invention can be applied to the case where a bit stream is to be transmitted. As a matter of course, as the recording medium, not only the recording medium such as an optical disc but also a semiconductor memory or the like can be used, if it is randomly accessible.

Industrial Applicability

As is clear from the above description, in the signal coding method and device of the present invention, a first signal generated from signals of a plurality of input channels is coded, and on the basis of signal levels of a part of the channels and the other channels, a second signal consisting only of a signal of the part of the channels or a second signal generated from the a plurality of input channels is coded. Selection information indicating which signal is selected as the second signal is also coded, and coding methods for the first and second signals are caused to be different coding methods. Thus, for example in the case where coding and decoding are carried out such that multi-channel is realized by extension to the new standard while reproduction by the former standard-adaptable reproducing device can be realized, the quantization noise generated by coding can be restrained to the minimum level, thus reducing the deterioration in sound quality.

Also, in the signal decoding method and device of the present invention, a code string including a first coded signal and a second coded signal is decoded, in which the first coded signal is generated from signals of a plurality of channels and coded, while the second coded signal is selected from a second signal consisting only of a signal of a part of the channels and a second signal generated from signals of the plurality of channels and coded. Selection information specifying the selection state of the second signal is taken out from the code string to control decoding, and in decoding, the first and second coded signals are decoded by different decoding methods, respectively. Thus, a signal which can be reproduced by the former standard-adaptable reproducing device and is extended in accordance with the new standard can be reproduced, and the quantization noise generated by coding and decoding can be restrained to the minimum level, thus reducing the deterioration in sound quality.

Moreover, in the signal recording medium of the present invention, a code string is recorded which includes a first coded signal obtained by coding a first signal generated from signals of a plurality of channels, a second coded signal obtained by selecting and coding a second signal consisting only of a signal of a part of the channels or a second signal generated from signals of the plurality of channels, coding parameters thereof, and selection information of the second signal. The first and second signals are coded by different coding method, respectively. Thus, a signal which can be reproduced by the former standard-adaptable reproducing device and is extended in accordance with the new standard can be reproduced, and the quantization noise generated by coding and decoding can be restrained to the minimum level, thus reducing the deterioration in sound quality.

What is claimed is:

1. A coding method for coding signals, comprising the steps of:

generating a first audio signal from a stereo channel included in a plurality of input channels, wherein the stereo channel corresponds to a right channel having an acoustic signal and a left channel having another acoustic signal;

determining a signal level corresponding to one of the right and left channels and another signal level from the other of the right and left channels;

selecting a second audio signal on the basis of the signal levels such that the second audio signal is selected from the group consisting of the right channel, the left channel, and a signal generated by subtracting the right channel from the left channel that is different than the first audio signal;

coding the first audio signal;

coding the selected second audio signal via a first coding technique; and coding a signal that indicates the selection of the second audio signal via a second coding technique;

wherein the first coding technique is different from the second coding technique.

2. The coding method as claimed in claim 1, further comprising the steps of:

generating selection information indicating which one of the group consisting of the one input channel, the other input channel, and a signal generated from the plurality of input channels that is different than the first audio signal is selected; and coding the selection information so that the selection information is associated with the coded first and the coded second audio signals.

3. The coding method as claimed in claim 1, further comprising the step of determining a ratio of the signal level from the one input channel to the other signal level from the other input channel, wherein when the ratio is greater than a predetermined threshold value, the second audio signal is selected from a group consisting of the one input channel and the other input channel.

4. The coding method as claimed in claim 1, further comprising the step of determining a ratio of the signal level from the one input channel to the other signal level from the other input channel, wherein when the ratio is smaller than a predetermined threshold value, the second audio signal is generated from the plurality of input channels and is different than the first audio signal.

5. The coding method as claimed in claim 1, wherein the signal level is the energy of at least one signal from the one input channel and the other signal level is the energy of at least one signal from the other input channel.

6. The coding method as claimed in claim 1, wherein the signal level is the amplitude of a signal from the one input channel and the other signal level is the amplitude of another signal from the other input channel.

7. The coding method as claimed in claim 1, wherein the first audio signal is generated by adding the acoustic signal of the right channel and the other acoustic signal of the left channel, and when the signal generated from the plurality of input channels that is different than the first audio signal is selected as the second audio signal, the second audio signal is generated by subtracting the acoustic signal of the right channel from the acoustic signal of the left channel.

8. The coding method as claimed in claim 1, wherein selection of the second audio signal is carried out for each predetermined frame.

9. The coding method as claimed in claim 1, wherein a first coding system is used to code the first audio signal and a second coding system is used to code the second audio signal, the first and second coding systems being different coding systems.

10. The coding method as claimed in claim 9, wherein the first and second audio signals are respective time series signals that are converted into respective spectral signal components corresponding to a plurality of conversion blocks each of a predetermined time period and then coded.

11. The coding method as claimed in claim 9, wherein the second audio signal is coded by variable length coding.

12. The coding method as claimed in claim 9, wherein the second audio signal is separated into a tone component on which the signal energy is concentrated and other non-tone components and then coded.

13. The coding method as claimed in claim 9, wherein a bit rate allocated to coding of the first audio signal and a bit rate allocated to coding of the second audio signal are different from each other.

14. The coding method as claimed in claim 10, wherein the size of one of the conversion blocks with respect to the second audio signal is greater than the size of a corresponding one of the conversion blocks with respect to the first audio signal.

15. The coding method as claimed in claim 10, wherein the spectral signal component of the one conversion block of the second audio signal is coded across a plurality of predetermined frames.

16. A coding device for coding signals, comprising:
    first signal generating means for generating a first audio signal from a stereo channel included in a plurality of input channels, wherein the stereo channel corresponds to a right channel having an acoustic signal and a left channel having another acoustic signal;
    second signal generating means for determining a signal level corresponding to one of the right and left channels and another signal level from the other of the right and left channels, and for selecting a second audio signal on the basis of the signal levels, such that the second audio signal is selected from the group consisting of the right channel, the left channel, and a signal generated by subtracting the right channel from the left channel that is different than the first audio signal; and
    coding means for coding the first audio signal, the selected second audio signal, and a signal that indicates the selection of the second audio signal, wherein coding the first audio signal is done via a first coding technique, and coding the selected second audio signal is done via a second coding technique which is different from said first coding technique.

17. The coding device as claimed in claim 16, wherein the second signal generating means generates selection information indicating which one of the group consisting of the one input channel, the other input channel, and a signal generated from the plurality of input channels that is different than the first audio signal is selected,
    the coding means operably configured to code the selection information together with the selected second signal.

18. The coding device as claimed in claim 16, wherein the second signal generating means is operably configured to select the second audio signal from a group consisting of the one input channel and the other input channel, when the ratio of the signal level from the one input channel to the other signal level from the other input channel is greater than a predetermined threshold value.

19. The coding device as claimed in claim 16, wherein the second signal generating means is operably configured to select as the second audio signal the signal generated from signals of the plurality of input channels that is different than the first audio signal, when the ratio of the signal level from the one input channel to the other signal level from the other input channel is smaller than a predetermined threshold value.

20. The coding device as claimed in claim 16, wherein the second signal generating means identifies the energy of at least one signal from the one input channel as the signal level and identifies the energy of at least one signal from the other input channel as the other signal level.

21. The coding device as claimed in claim 16, wherein the second signal generating means identifies the amplitude of a signal from the one input channel as the signal level and identifies the amplitude of another signal from the other input channel as the other signal level.

22. The coding device as claimed in claim 16, wherein the first signal generating means has an adder for adding the acoustic signal of the right channel and the other acoustic signal of the left channel,
    the second signal generating means having a subtractor for subtracting the acoustic signal of the right channel and the other acoustic signal of the left channel.

23. The coding device as claimed in claim 16, wherein the second signal generating means carries out selection of the second audio signal for each predetermined frame.

24. The coding device as claimed in claim 16, wherein the coding means codes the first audio signal and the second audio signal using different coding systems, respectively.

25. The coding device as claimed in claim 16, wherein the coding means converts the first and second audio signals as time series signals into a respective plurality of spectral signal components corresponding to a respective plurality of conversion blocks, each conversion block of a predetermined time period, and codes the respective spectral signal components.

26. The coding device as claimed in claim 24, wherein the coding means codes the second audio signal by variable length coding.

27. The coding device as claimed in claim 24, wherein the coding means separates the second audio signal into a tone component on which the signal energy is concentrated and other non-tone components, and codes these components.

28. The coding device as claimed in claim 24, wherein in the coding means allocates a first bit rate to coding of the first audio signal and a second bit rate to coding of the second audio signal that are different from each other.

29. The coding device as claimed in claim 25, wherein in the coding means, the size of one of the conversion blocks with respect to the second audio signal is greater than the size of the conversion block with respect to the first audio signal.

30. The coding device as claimed in claim 25, wherein the coding means codes the spectral signal component of one of the conversion blocks of the second audio signal across a plurality of predetermined frames.

31. A decoding method for decoding coded signals, comprising the steps of:
    separating from a code string a first coded signal, a second coded signal, and constituent information indicating a constituent state of a channel signal constitution the second coded signal;

decoding the separated first and second coded signals, respectively, to generate first and second signals, wherein decoding the separated first coded signal to generate a first signal is done via a first decoding technique, and decoding the separated second coded signal to generate a second signal is done via a second decoding technique which is different from said first decoding technique; and selecting restoration processing for generating a plurality of channel signals from the first and second signals on the basis of the constituent information.

32. A decoding method for decoding coded signals, comprising the steps of:

separating a first coded signal, a second coded signal, and a signal that indicates a selection of the second coded signal from a code string including the first coded signal, the second coded signal, and the signal that indicates the selection of the second coded signal, the first coded signal being generated from a stereo channel included in a plurality of channels, the stereo channel corresponding to a right channel having an acoustic signal and a left channel having another acoustic signal, the second coded signal being selected and coded on a basis of a signal level of the right channel and a signal level of the left channel so that the second coded signal is selected from the group consisting of the right channel, the left channel, and a signal generated by subtracting the right channel from the left channel that is different than the first coded signal;

decoding the separated first coded signal, second coded signal, and signal that indicates the selection of the second coded signal, respectively, wherein decoding the separated first coded signal is done via a first decoding technique, and decoding the second coded signal is done via a second decoding technique which is different from said first decoding technique; and restoring a respective output signal for each of the plurality of channels from the decoded first and second coded signals.

33. The decoding method as claimed in claim 32, wherein selection information specifying a selection state of the second coded signal is also separated from the code string, and decoding of the first and second coded signals and restoring of the respective output signal for each of the plurality of channels are controlled on the basis of the selection information.

34. The decoding method as claimed in claim 32, wherein the first coded signal corresponds to a signal found by adding the acoustic signal of the right channel and the acoustic signal of the left channel, and the signal generated from the plurality of channels that is different than the first coded signal is found by subtracting the acoustic signal of the right channel from the acoustic signal of the left channel.

35. The decoding method as claimed in claim 32, wherein the separated first and second coded signals are decoded using different decoding systems, respectively.

36. The decoding method as claimed in claim 35, wherein the first and second coded signals obtained by coding spectral signal components are converted to corresponding first and second component signals on the time base for each predetermined conversion block, and the conversion blocks are synthesized to decode corresponding first and second signals in time series for restoration of the respective output signal for each of the plurality of channels.

37. The decoding method as claimed in claim 35, wherein the second coded signal coded by variable length coding is decoded.

38. The decoding method as claimed in claim 35, wherein a tone component on which the signal energy is concentrated and other non-tone components are decoded from the second coded signal, and the decoded tone component and other non-tone components are synthesized to generate a corresponding second signal for restoring the respective output signal for at least one of the plurality of channels.

39. The decoding method as claimed in claim 35, wherein a bit rate of the first coded signal and a bit rate of the second coded signal are different from each other.

40. The decoding method as claimed in claim 36, wherein the size of the conversion block with respect to the second coded signal is greater than the size of the conversion block with respect to the first coded signal.

41. The decoding method as claimed in claim 36, wherein the spectral signal component of the conversion block of the second coded signal is decoded across a plurality of predetermined frames.

42. The decoding method as claimed in claim 33, wherein when the selection information indicates that the second coded signal consists of a signal corresponding to a first of the plurality of channels, a signal of the first channel is decoded from the second coded signal, and the respective signal for each of the plurality of channels is restored from the decoded second signal corresponding to a first of the plurality of channels and the decoded first signal corresponding to each of the plurality of channels.

43. The decoding method as claimed in claim 33, wherein when the selection information indicates that the second coded signal is the signal generated from the plurality of channels that is different than the first coded signal, a signal component of each respective output signal for each of the plurality of channels is decoded from the second coded signal, and the respective output signal for each of the plurality of channels is restored from the decoded second signal and the decoded first signal.

44. The decoding method as claimed in claim 33, wherein the selection information indicates the selection state of the second coded signal for each predetermined frame.

45. A decoding device for decoding coded signals, comprising:

separating means for separating from a code string a first coded signal, a second coded signal, and constituent information indicating a constituent state of a channel signal constituting the second coded signal;

decoding means for decoding the separated first and second coded signals, respectively, to generate first and second signals, wherein decoding the separated first coded signal to generate a first signal is done via a first decoding technique, and decoding the separated second coded signal to generate a second signal is done via a second decoding technique which is different from said first decoding technique; and control means for selecting restoration processing for generating a plurality of channel signals from the first and second signals on the basis of the constituent information.

46. A decoding device for decoding coded signals, comprising:

separating means for separating a first coded signal, a second coded signal, and a signal that indicates a selection of the second coded signal from a code string including the first coded signal, the second coded, and the signal that indicates the selection of the second coded signal, the first coded signal being generated from a stereo channel included in a plurality of channels, the stereo channel corresponding to a right channel having an acoustic signal and a left channel having another acoustic signal, the second coded signal being selected and coded on the basis of a signal level of the right channel and a signal level of the left channel so that the second coded signal is selected from the group consisting of the right channel, the left channel, and a signal generated by subtracting the right channel from the left channel that is different than the first coded signal;

decoding means for decoding the separated first coded signal, second coded signal, and signal that indicates the selection of the second coded signal, respectively, wherein decoding the separated first coded signal is done via a first decoding technique, and decoding the second coded signal is done via a second decoding technique which is different from said first coding technique; and restoring means for restoring a respective output signal for each of the plurality of channels from the decoded first and second signals.

47. The decoding device as claimed in claim 46, wherein the separating means also separates selection information specifying a selection state of the second coded signal from the code string, the device further comprising control means for controlling decoding of the first and second coded signals and restoration of the respective output signal for each of the plurality of channels on the basis of the selection information.

48. The decoding device as claimed in claim 46, wherein the first coded signal corresponds to a signal found by adding the acoustic signal of the right channel and the acoustic signal of the left channel, and the signal generated from the plurality of channels that is different than the first coded signal is found by subtracting the acoustic signal of the right channel from the acoustic signal of the left channel.

49. The decoding device as claimed in claim 46, wherein the decoding means decodes the separated first and second coded signals by using different decoding systems, respectively.

50. The decoding device as claimed in claim 49, wherein the decoding means converts the first and second coded signals obtained by coding spectral signal components to corresponding first and second component signals on the time base for each predetermined conversion block, and synthesizes the conversion blocks to decode corresponding first and second signals in time series for restoration of the respective output signal for each of the plurality of channels.

51. The decoding device as claimed in claim 49, wherein the decoding means decodes the second coded signal coded by variable length coding.

52. The decoding device as claimed in claim 49, wherein the decoding means decodes a tone component on which the signal energy is concentrated and other non-tone components from the second coded signal, and synthesizes the decoded tone component and other non-tone components to generate a corresponding second signal for restoring the respective output signal for at least one of the plurality of channels.

53. The decoding device as claimed in claim 49, wherein a bit rate of the first coded signal and a bit rate of the second coded signal are different from each other.

54. The decoding device as claimed in claim 50, wherein the size of the conversion block with respect to the second coded signal is greater than the size of the conversion block with respect to the first coded signal.

55. The decoding device as claimed in claim 50, wherein the decoding means decodes the spectral signal component of the conversion block of the second coded signal across a plurality of predetermined frames.

56. The decoding device as claimed in claim 47, wherein when the selection information indicates that the second coded signal consists of a signal corresponding to a first of the plurality of channels, the control means controls the decoding means to decode a signal of the first channel from the second coded signal, and controls the restoring means to restore the respective output signal for each of the plurality of channels from the decoded signal of the first channel and the decoded first signal.

57. The decoding device as claimed in claim 47, wherein when the selection information indicates that the second coded signal is the signal generated from the plurality of channels that is different than the first coded signal, the control means controls the decoding means to decode a signal component of each respective output signal for each of the plurality of channels from the second coded signal, and controls the restoring means to restore the respective output signal for each of the plurality of channels from the decoded second signal and the decoded first signal.

58. The decoding device as claimed in claim 47, wherein the selection information indicates the selection state of the second signal for each predetermined frame, the control means controlling the decoding and restoration for each predetermined frame.

59. A computer-readable medium containing instructions for controlling a recording and/or reproducing system to perform a method, the recording and/or reproducing system having a memory, the memory having a code string recorded thereon, the method comprising separating a first coded signal, a second coded signal, and a signal that indicates a selection of the second coded signal from the code string including the first coded signal, the second coded signal, and the signal that indicates the selection of the second coded signal, the first coded signal corresponding to a first audio signal generated from a stereo channel included in a plurality of channels, wherein the stereo channel corresponds to a right channel having an acoustic signal and a left channel having another acoustic signal, the second coded signal corresponding to a signal selected on the basis of signal level of the right channel and a signal level of the left channel such that the second coded signal is selected from the group consisting of the right channel, the left channel, and a signal generated by subtracting the right channel from the left channel that is different than the first coded signal;

decoding the separated first coded signal, second coded signal, and signal that indicates the selection of the second coded signal, respectively, wherein decoding the separated first coded signal is done via a first decoding technique, and decoding the second coded signal is done via a second decoding technique which is different from said first decoding technique; and restoring a respective output signal for each of the plurality of channels from the decoded first and second coded signals.

60. The computer-readable medium as claimed in claim 59, wherein the code string includes a selection information is also separated from the code string, the selection information indicating which one of the group consisting of the one input channel, the other input channel, and a signal generated from the plurality of input channels that is different than the first audio signal is selected.

61. The computer-readable medium as claimed in claim 59, wherein the first coded signal and the second coded signal are decoded using coding systems that are different from each other.

* * * * *